United States Patent
Hsiao et al.

(10) Patent No.: US 10,042,890 B2
(45) Date of Patent: Aug. 7, 2018

(54) PARAMETERIZED CONTINUOUS QUERY TEMPLATES

(71) Applicant: Oracle International Corporation, Redwood Shores, CA (US)

(72) Inventors: Eric Hsiao, San Mateo, CA (US); Xiaochao Zhou, Beijing (CN); Jianrong Zhang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/827,631

(22) Filed: Mar. 14, 2013

(65) Prior Publication Data

US 2014/0095543 A1    Apr. 3, 2014

Related U.S. Application Data

(60) Provisional application No. 61/707,641, filed on Sep. 28, 2012.

(51) Int. Cl.
*G06F 7/00* (2006.01)
*G06F 17/30* (2006.01)

(52) U.S. Cl.
CPC .. *G06F 17/30516* (2013.01); *G06F 17/30389* (2013.01); *G06F 17/30424* (2013.01);
(Continued)

(58) Field of Classification Search
CPC ......... G06F 17/30516; G06F 17/30554; G06F 17/30557; G06F 17/30498;
(Continued)

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101059688 | 10/2007 |
| CN | 101866353 | 10/2010 |

(Continued)

OTHER PUBLICATIONS

Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.

(Continued)

*Primary Examiner* — Paul Kim
(74) *Attorney, Agent, or Firm* — Kilpatrick Townsend and Stockton LLP

(57) ABSTRACT

Techniques for managing parameterized continuous query templates are provided. In some examples, a continuous query may be generated based at least in part on one or more selections of one or more business logic templates and business event parameters associated with a user. The continuous query may also be configured to retrieve business event data of the user. In some examples, a service provider may receive selection of one or more business logic templates. The service provider may also receive the business event parameters associated with the user. The business event parameters may be received via the selected template. The continuous query may then be generated using the information received via the template.

19 Claims, 9 Drawing Sheets

(52) U.S. Cl.
CPC .. *G06F 17/30442* (2013.01); *G06F 17/30451* (2013.01); *G06F 17/30457* (2013.01); *G06F 17/30477* (2013.01); *G06F 17/30483* (2013.01); *G06F 17/30498* (2013.01); *G06F 17/30548* (2013.01); *G06F 17/30551* (2013.01); *G06F 17/30554* (2013.01); *G06F 17/30557* (2013.01); *G06F 17/30616* (2013.01); *G06F 17/30864* (2013.01); *G06F 17/30958* (2013.01)

(58) Field of Classification Search
CPC ......... G06F 17/30958; G06F 17/30616; G06F 17/30442; G06F 17/30477; G06F 17/30424; G06F 17/30548; G06F 17/30457; G06F 17/03
See application file for complete search history.

(56) References Cited

U.S. PATENT DOCUMENTS

| | | | |
|---|---|---|---|
| 5,339,392 A | 8/1994 | Risberg et al. |
| 5,495,600 A | 2/1996 | Terry et al. |
| 5,691,917 A | 11/1997 | Harrison |
| 5,706,494 A | 1/1998 | Cochrane et al. |
| 5,802,262 A | 9/1998 | Van De |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |

(56) References Cited

U.S. PATENT DOCUMENTS

| | | |
|---|---|---|
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,332,502 B1 | 12/2012 | Neuhaus et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,739 B2 * | 5/2013 | Naibo et al. ............... 707/688 |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,038 B2 | 4/2014 | Cohen et al. |
| 8,713,049 B2 | 4/2014 | Jain et al. |
| 8,719,207 B2 | 5/2014 | Ratnam et al. |
| 8,738,572 B2 | 5/2014 | Bird et al. |
| 8,745,070 B2 | 6/2014 | Krisnamurthy |
| 8,762,369 B2 | 6/2014 | Macho et al. |
| 8,775,412 B2 | 7/2014 | Day et al. |
| 8,880,493 B2 | 11/2014 | Chen et al. |
| 9,015,102 B2 | 4/2015 | van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 | 1/2017 | Park et al. |
| 9,563,663 B2 | 2/2017 | Shukla et al. |
| 9,703,836 B2 | 7/2017 | Hsiao et al. |
| 9,712,645 B2 | 7/2017 | de Castro Alves et al. |
| 9,715,529 B2 | 7/2017 | Park et al. |
| 2002/0023211 A1 | 2/2002 | Roth et al. |
| 2002/0032804 A1 | 3/2002 | Hunt |
| 2002/0038217 A1 | 3/2002 | Young |
| 2002/0038306 A1 | 3/2002 | Griffin et al. |
| 2002/0038313 A1 | 3/2002 | Klein et al. |
| 2002/0049788 A1 | 4/2002 | Lipkin |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097075 A1 | 5/2005 | Ryan et al. |
| 2005/0108368 A1 | 5/2005 | Mohan |
| 2005/0120016 A1 * | 6/2005 | Midgley .................. 707/5 |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0167869 A1 | 6/2006 | Jones et al. |
| 2006/0155719 A1 | 7/2006 | Mihaeli et al. |

(56) References Cited

U.S. PATENT DOCUMENTS

| | | |
|---|---|---|
| 2006/0166704 A1 | 7/2006 | Benco et al. |
| 2006/0167704 A1* | 7/2006 | Nicholls et al. .................. 705/1 |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0168154 A1 | 7/2007 | Ericson |
| 2007/0192301 A1 | 8/2007 | Posner |
| 2007/0198479 A1 | 8/2007 | Cai et al. |
| 2007/0022092 A1 | 9/2007 | Nishizawa et al. |
| 2007/0214171 A1 | 9/2007 | Behnen et al. |
| 2007/0226188 A1 | 9/2007 | Johnson et al. |
| 2007/0226239 A1 | 9/2007 | Johnson et al. |
| 2007/0250487 A1 | 10/2007 | Reuther |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | Mcgoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0098370 A1 | 4/2008 | Fontoura et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | Mcwilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun et al. |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0292979 A1 | 11/2009 | Aggarwal |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri et al. |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishikawa |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1* | 9/2010 | Chen .................. G06F 17/30516 707/759 |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |

(56) References Cited

U.S. PATENT DOCUMENTS

| | | |
|---|---|---|
| 2011/0016123 A1 | 1/2011 | Pandey et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1* | 2/2011 | Mason ............... G06Q 10/06 705/7.13 |
| 2011/0040746 A1 | 2/2011 | Handa et al. |
| 2011/0040827 A1 | 2/2011 | Katsunuma et al. |
| 2011/0055192 A1 | 3/2011 | Tang et al. |
| 2011/0055197 A1 | 3/2011 | Chavan |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra et al. |
| 2011/0270879 A1 | 11/2011 | Srinivasan et al. |
| 2011/0282812 A1 | 11/2011 | Chandramouli et al. |
| 2011/0295841 A1 | 12/2011 | Sityon et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0066855 A1 | 3/2013 | Gupta et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne et al. |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1 | 1/2017 | De Castro et al. |
| 2017/0075726 A1 | 3/2017 | Park et al. |

FOREIGN PATENT DOCUMENTS

| | | |
|---|---|---|
| CN | 102135984 | 7/2011 |
| CN | 102665207 | 9/2012 |
| CN | 102892073 | 1/2013 |
| CN | 104885077 | 9/2015 |
| CN | 104937591 | 9/2015 |
| CN | 105074698 | 11/2015 |
| CN | 105308592 | 2/2016 |
| CN | 105379183 | 3/2016 |
| CN | 105593854 | 5/2016 |
| EP | 1 241 589 A2 | 9/2002 |
| EP | 2474922 | 7/2012 |
| EP | 2946314 | 11/2015 |
| EP | 2946527 | 11/2015 |
| EP | 2959408 | 12/2015 |
| JP | 2002-251233 A | 9/2002 |
| JP | 2006338432 | 12/2006 |
| JP | 2007-328716 A | 12/2007 |
| JP | 2008-541225 A | 11/2008 |
| JP | 2009-134689 A | 6/2009 |
| JP | 2009171193 | 7/2009 |
| JP | 2010-108073 A | 5/2010 |
| JP | 2011-039818 A | 2/2011 |
| JP | 2015536001 | 12/2015 |
| JP | 2016500167 | 1/2016 |
| JP | 2016500168 | 1/2016 |
| JP | 2016503216 | 2/2016 |
| JP | 2016504679 | 2/2016 |
| WO | 00/49533 A2 | 8/2000 |
| WO | 0049533 | 8/2000 |
| WO | 0118712 | 3/2001 |
| WO | 10/59602 A1 | 8/2001 |
| WO | 01/65418 A1 | 9/2001 |
| WO | 03/030031 A2 | 4/2003 |
| WO | 2007122347 | 11/2007 |
| WO | WO2009/119811 A | 10/2009 |
| WO | 2010050582 | 5/2010 |
| WO | 2012/037511 A1 | 3/2012 |
| WO | 2012050582 | 4/2012 |
| WO | 2012/154408 A1 | 11/2012 |
| WO | 2012/158360 A1 | 11/2012 |
| WO | 2014000819 | 1/2014 |
| WO | 2015191120 | 12/2015 |
| WO | WO2016/048912 | 3/2016 |

(56) References Cited

FOREIGN PATENT DOCUMENTS

OTHER PUBLICATIONS

What is BPM? , Datasheet [online]. IBM, [retrieved on Jan. 28, 2013]. Retrieved from the Internet: <URL: http://www-01.ibm.com/software/info/bpm/whatis-bpm/>.
U.S. Appl. No. 12/548,281, Final Office Action dated Oct. 10, 2013, 21 pages.
U.S. Appl. No. 12/548,290, Notice of Allowance dated Sep. 11, 2013, 6 pages.
U.S. Appl. No. 12/949,081, Final Office Action dated Aug. 27, 2013, 13 pages.
U.S. Appl. No. 13/089,556, Final Office Action dated Aug. 29, 2013, 10 pages.
U.S. Appl. No. 13/177,748, Non-Final Office Action dated Aug. 30, 2013, 24 pages.
U.S. Appl. No. 13/193,377, Notice of Allowance dated Aug. 30, 2013, 19 pages.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, at URL: http://www-db.stanford.edu/stream/sqr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Oracle Application Server 10g, Release 2 and 3, New Features Overview, An Oracle White Paper, Oracle., Oct. 2005, 48 pages.
Oracle Database, SQL Reference, 10g Release 1 (10.1), Part No. B10759-01, Dec. 2003, pp. 7-1 to 7-17; 7-287 to 7-290; 14-61 to 14-74.
Complex Event Processing in the Real World, An Oracle White Paper., Sep. 2007, 13 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version 2.0, Jul. 2007, 90 pages.
Dependency Injection, Wikipedia, printed on Apr. 29, 2011, at URL: D http:en.wikipedia.org/w/index. php?title=DependencLinjection &0ldid=260831402,, Dec. 30, 2008, pp. 1-7.
Deploying Applications to WebLogic Server, BEA WebLogic Server, ver. D 10.0, Mar. 30, 2007, 164 pages.
Developing Applications with Weblogic Server, BEA WebLogic Server, ver. D 10.0, Mar. 30, 2007, 254 pages.
EPL Reference, BEA WebLogic Event Server, ver. 2.0, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01 /wls/docs1 OO/quickstart/quick_start. html, May 10, 2010, 1page.
Getting Started with WebLogic Event Server, BEA WebLogic Event Serverver 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, BEA WebLogic Real Time, ver. 2.0,, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
OSGI Service Platform Core Specification, The OSGI Alliance, OSGI Alliance, ver. 4.1, release 4, Apr. 2007, 288 pages.
Release Notes, BEA WebLogic Event Server, Ver. 2.0, Jul. 2007, 8 pages.
Spring Dynamic Modules for OSGi Service Platforms product documentation, SpringSource, D, Jan. 2008, 71 pages.
Stream Base New and Noteworthy, Stream Base, Jan. 1, 2010, 878 pages.
Stream Query Repository: Online Auctions (CQL Queries)., Retrieved from: URL: http://www-db.stanford.edu/strem/sqr/cql/onauc.html, Dec. 2, 2002, 4 pages.
Stream: The Stanford Stream Data Manager, IEEE Data Engineering Bulletin., Mar. 2003, pp. 1-8.
Stream: The Stanford Stream Data Manager, Retrieved from: URL: http://infolab.stanford.edu/stream/, Jan. 5, 2006, pp. 1-9.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, WebSphere Software, IBM/Redbooks, ,., Dec. 2007, 634 pages.
U.S. Appl. No. 10/948,523, Final Office Action dated Jul. 6, 2007, 37 pages.
U.S. Appl. No. 10/948,523, Non-Final Office Action dated Dec. 11, 2007, 47 pages.
U.S. Appl. No. 10/948,523, Notice of Allowance dated Dec. 1, 2010, 17 pages.
U.S. Appl. No. 10/948,523, Notice of Allowance dated Jul. 8, 2008, 30 pages.
U.S. Appl. No. 10/948,523, Office Action dated Jan. 22, 2007, 31 pages.
U.S. Appl. No. 10/948,523, Supplemental Notice of Allowance dated Jul. 17, 2008, 17 pages.
U.S. Appl. No. 10/948,523, Supplemental Notice of Allowance dated Aug. 25, 2008, 3 pages.
U.S. Appl. No. 11/601,415, Advisory Action dated Aug. 18, 2009, 3 pages.
U.S. Appl. No. 11/601,415, Final Office Action dated Jul. 2, 2012.
U.S. Appl. No. 11/601,415, Final Office Action dated May 27, 2009, 26 pages.
U.S. Appl. No. 11/601,415, Final Office Action dated Jun. 30, 2010, 45 pages.
U.S. Appl. No. 11/601,415, Non-Final Office Action dated Sep. 17, 2008, 10 pages.

(56) References Cited

OTHER PUBLICATIONS

U.S. Appl. No. 11/601,415, Non-Final Office Action dated Nov. 30, 2009, 32 pages.
U.S. Appl. No. 11/601,415, Office Action dated Dec. 9, 2011.
U.S. Appl. No. 11/873,407, Final Office Action dated Apr. 26, 2010, 11 pages.
U.S. Appl. No. 11/873,407, Non-Final Office Action dated Nov. 13, 2009, 7 pages.
U.S. Appl. No. 11/873,407, Notice of Allowance dated Nov. 10, 2010, 14 pages.
U.S. Appl. No. 11/873,407, Notice of Allowance dated Mar. 7, 2011, 8 pages.
U.S. Appl. No. 11/874,197, Final Office Action dated Aug. 12, 2011, 26 pages.
U.S. Appl. No. 11/874,197, Final Office Action dated Jun. 29, 2010, 17 pages.
U.S. Appl. No. 11/874,197, Non-Final Office Action dated Dec. 22, 2010, 22 pages.
U.S. Appl. No. 11/874,197, Office Action dated Nov. 10, 2009, 14 pages.
U.S. Appl. No. 11/874,202, Final Office Action dated Jun. 8, 2010, 200 pages.
U.S. Appl. No. 11/874,202, Non-Final Office Action dated Dec. 3, 2009, 20 pages.
U.S. Appl. No. 11/874,202, Notice of Allowance dated Mar. 31, 2011, 12 pages.
U.S. Appl. No. 11/874,202, Notice of Allowance dated Dec. 22, 2010, 29 pages.
U.S. Appl. No. 11/874,850, Notice of Allowance dated Jan. 27, 2010, 11 pages.
U.S. Appl. No. 11/874,850, Notice of Allowance dated Nov. 24, 2009, 17 pages.
U.S. Appl. No. 11/874,850, Notice of Allowance dated Dec. 11, 2009, 5 pages.
U.S. Appl. No. 11/874,896, Final Office Action dated Jul. 23, 2010, 28 pages.
U.S. Appl. No. 11/874,896, Non-Final Office Action dated Dec. 8, 2009, 19 pages.
U.S. Appl. No. 11/874,896, Non-Final Office Action dated Nov. 22, 2010, 25 pages.
U.S. Appl. No. 11/874,896, Notice of Allowance dated Jun. 23, 2011, 30 pages.
U.S. Appl. No. 11/927,681, Non-Final Office Action dated Mar. 24, 2011, 17 pages.
U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 13 pages.
U.S. Appl. No. 11/927,683, Notice of Allowance dated Nov. 9, 2011, 10 pages.
U.S. Appl. No. 11/977,437, Final Office Action dated Apr. 8, 2010, 18 pages.
U.S. Appl. No. 11/977,437, Non-Final Office Action dated Oct. 13, 2009, 9 pages.
U.S. Appl. No. 11/977,437, Notice of Allowance dated Mar. 4, 2013, 9 pages.
U.S. Appl. No. 11/977,437, Office Action dated Aug. 3, 2012.
U.S. Appl. No. 11/977,439, Non-Final Office Action dated Apr. 13, 2010, 7 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Sep. 28, 2010, 6 pages.
U.S. Appl. No. 11/977,439, Notice of Allowance dated Nov. 24, 2010, 8 pages.
U.S. Appl. No. 11/977,440, Notice of Allowance dated Oct. 7, 2009, 6 pages.
U.S. Appl. No. 12/193,377, Final Office Action dated Jan. 17, 2013, 24 pages.
U.S. Appl. No. 12/395,871, Non-Final Office Action dated May 27, 2011, 7 pages.
U.S. Appl. No. 12/395,871, Notice of Allowance dated May 4, 2012, 27 pages.
U.S. Appl. No. 12/395,871, Office Action dated Oct. 19, 2011, 33 pages.
U.S. Appl. No. 12/396,008, Non-Final Office Action dated Jun. 8, 2011, 10 pages.
U.S. Appl. No. 12/396,008, Notice of Allowance dated Nov. 16, 2011, 5 pages.
U.S. Appl. No. 12/396,464, Final Office Action dated Jan. 16, 2013, 17 pages.
U.S. Appl. No. 12/396,464, Non-Final Office Action dated Sep. 7, 2012, 18 pages.
U.S. Appl. No. 12/506,891, Notice of Allowance dated Jul. 25, 2012, 8 pages.
U.S. Appl. No. 12/506,891, Office Action dated Dec. 14, 2011, 41 pages.
U.S. Appl. No. 12/506,905, Advisory Action dated Nov. 6, 2012, 6 pages.
U.S. Appl. No. 12/506,905, Notice of Allowance dated Dec. 14, 2012, 15 pages.
U.S. Appl. No. 12/506,905, Office Action dated Aug. 9, 2012, 42 pages.
U.S. Appl. No. 12/506,905, Office Action dated Mar. 26, 2012, 86 pages.
U.S. Appl. No. 12/534,384, Notice of Allowance dated May 7, 2013, 12 pages.
U.S. Appl. No. 12/534,384, Office Action dated Feb. 28, 2012, 38 pages.
U.S. Appl. No. 12/534,384, Office Action dated Feb. 12, 2013, 14 pages.
U.S. Appl. No. 12/534,398, Final Office Action dated Jun. 6, 2012, 27 pages.
U.S. Appl. No. 12/534,398, Notice of Allowance dated Nov. 27, 2012, 10 pages.
U.S. Appl. No. 12/534,398, Office Action dated Nov. 1, 2011, 32 pages.
U.S. Appl. No. 12/548,187, Non Final Office Action dated Sep. 27, 2011, 19 pages.
U.S. Appl. No. 12/548,187, Non-Final Office Action dated Apr. 9, 2013, 17 pages.
U.S. Appl. No. 12/548,187, Office Action dated Jun. 20, 2012, 31 pages.
U.S. Appl. No. 12/548,209, Notice of Allowance dated Oct. 24, 2012, 22 pages.
U.S. Appl. No. 12/548,209, Office Action dated Apr. 16, 2012, 40 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 19 pages.
U.S. Appl. No. 12/548,222, Office Action dated Jun. 20, 2012, 29 pages.
U.S. Appl. No. 12/548,281, Non-Final Office Action dated Apr. 12, 2013, 16 pages.
U.S. Appl. No. 12/548,281, Non-Final Office Action dated Oct. 3, 2011, 20 pages.
U.S. Appl. No. 12/548,281, Office Action dated Jun. 20, 2012, 29 pages.
U.S. Appl. No. 12/548,290, Final Office Action dated Jul. 30, 2012, 34 pages.
U.S. Appl. No. 12/548,290, Non-Final Office Action dated Oct. 3, 2011, 17 pages.
U.S. Appl. No. 12/548,290, Non-Final Office Action dated Apr. 15, 2013, 17 pages.
U.S. Appl. No. 12/874,197, Notice of Allowance dated Jun. 22, 2012.

(56) References Cited

OTHER PUBLICATIONS

U.S. Appl. No. 12/913,636, Final Office Action dated Jan. 8, 2013, 21 pages.
U.S. Appl. No. 12/913,636, Office Action dated Jun. 7, 2012.
U.S. Appl. No. 12/949,081, filed Nov. 18, 2010.
U.S. Appl. No. 12/949,081, Non-Final Office Action dated Jan. 9, 2013, 12 pages.
U.S. Appl. No. 12/957,194, filed Nov. 30, 2010.
U.S. Appl. No. 12/957,194, Non-Final Office Action dated Dec. 7, 2012, 11 pages.
U.S. Appl. No. 12/957,194, Notice of Allowance dated Mar. 20, 2013, 9 pages.
U.S. Appl. No. 12/957,201, filed Nov. 30, 2010.
U.S. Appl. No. 12/957,201, Final Office Action dated Apr. 25, 2013, 11 pages.
U.S. Appl. No. 12/957,201, Office Action dated Dec. 19, 2012, 15 pages.
U.S. Appl. No. 13/089,556, Non-Final Office Action dated Apr. 10, 2013, 10 pages.
U.S. Appl. No. 13/089,556, Office Action dated Nov. 6, 2012, 13 pages.
U.S. Appl. No. 13/089,556, filed Apr. 19, 2011.
U.S. Appl. No. 13/102,665, Office Action dated Feb. 1, 2013, 14 pages.
U.S. Appl. No. 13/107,742, Non-Final Office Action dated Feb. 14, 2013, 16 pages.
U.S. Appl. No. 13/184,528, Notice of Allowance dated Mar. 1, 2012.
U.S. Appl. No. 13/193,377, Office Action dated Jan. 17, 2013, 25 pages.
U.S. Appl. No. 13/193,377, Office Action dated Aug. 23, 2012, 48 pages.
U.S. Appl. No. 13/244,272, Final Office Action dated Mar. 28, 2013, 29 pages.
U.S. Appl. No. 13/244,272, Office Action dated Oct. 4, 2012.
U.S. Appl. No. 13/396,464, Office Action dated Sep. 7, 2012.
Abadi, et al., Yes Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 11 pages.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., STREAM: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan, et al., Efficient Filtering of XML documents with Xpath expressions, VLDB Journal D, 2002, pp. 354-379.
Chandrasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, pp. 379-390.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.
Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.
Golab, et al., Sliding Window Query Processing Over Data Streams, University of Waterloo, D Waterloo, Ont. Canada, Aug. 2006, 182 pages.
Gosling, et al., The Java Language Specification, Book, copyright, 3rd edition, FG, Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.

(56) References Cited

OTHER PUBLICATIONS

Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, pp. 323-350.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.
Liu, et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? Complex Event Processing, downloaded, at URL:http://complexevents.com/?p=103, Apr. 29, 2011, 5 pages.
Madden, et al., Continuously Adaptive Continuous Queries (CACQ) over Streams, SIGMOD, Jun. 4-6, 2002, 12 pages.
Martin, et al., Finding Application Errors and Security Flaws Using PQL, a Program Query Language, OOPSLA'05, Oct. 16, 2005, pp. 1-19.
Babcock, et al., Models and Issues in Data Streams, Proceedings of the 21st ACM SIGMOD-SIGACT-SIDART symposium on Principles of database systems, 2002, 30 pages.
Motwani, et al., Query Processing Resource Management, and Approximation in a Data 0 Stream Management System, Proceedings of CIDR, Jan. 2003, 12 pages.
Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah, et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion dated Nov. 17, 2011, 55 pages.
International Application No. PCT/US2012/034970, International Search Report and Written Opinion dated Jul. 16, 2012, 13 pages.
International Application No. PCT/US2012/036353, International Search Report and Written Opinion dated Sep. 12, 2012, 11 pages.
Peng, et al., Xpath Queries on Streaming Data, 2003, pp. 1-12.
Peterson, Petri Net Theory and the Modeling of Systems, Prentice Hall, 1981, 301 pages.
PostgresSQL, Manuals: PostgresSQL 8.2: Create Aggregate, believed to be prior to Apr. 21, 2007, 4 pages.
PostgresSQL, Documentation: Manuals: PostgresSQL 8.2: User-Defined Aggregates believed to be prior to Apr. 21, 2007, 4 pages.
Sadri, et al., Expressing and Optimizing Sequence Queries in Database Systems, ACM Transactions on Database Systems, vol. 29, No. 2, ACM Press, Copyright, Jun. 2004, pp. 282-318.
Sadtler, et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf, et al., Efficient Scheduling of Heterogeneous Continuous Queries, VLDB, Sep. 12-15, 2006, pp. 511-522.
Stolze, et al., User-defined Aggregate Functions in DB2 Universal Database, Retrievd from: <http://www.128. ibm.com/deve10perworks/d b2/1 ibrary/tachartic1e/0309stolze/0309stolze.html>, Sep. 11, 2003, 11 pages.
Stump, et al., Proceedings, The 2006 Federated Logic Conference, IJCAR '06 Workshop, PLPV '06: Programming Languages meets Program Verification, 2006, pp. 1-113.
Terry, et al., Continuous queries over append-only database, Proceedings of ACM SIGMOD, 1992, pp. 321-330.
Ullman, et al., Introduction to JDBC, Stanford University, 2005, 7 pages.
Vajjhala, et al., The Java Architecture for XML Binding (JAXB) 2.0, Sun Microsystem, D Inc., Final Release , Apr. 19, 2006, 384 pages.
Vijayalakshmi, et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang, et al., Distributed continuous range query processing on moving objects, DEXA'06 Proceedings of the 17th international conference on Database and Expert Systems Applications, 2006, pp. 655-665.
White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom, et al., CQL: A Language for Continuous Queries over Streams and Relations, Oct. 17, 2007, 62 pages.
Widom, et al., The Stanford Data Stream Management System, PowerPoint Presentation, Oct. 17, 2007, 110 pages.
Wu, et al., Dynamic Data Management for Location Based Services in Mobile Environments, Database Engineering and Applications Symposium, Jul. 16, 2003, pp. 172-181.
Zemke, XML Query, mailed on Mar. 14, 2004, 29 pages.
SQL Tutorial-In, Tizag.com, http://web.archive.org/web/20090216215219/http://www.tizag.com/sqiTutorial/sqlin.php, Feb. 16, 2009, pp. 1-3.
U.S. Appl. No. 12/548,187, Final Office Action, dated Jun. 10, 2013, 18 pages.
U.S. Appl. No. 12/548,222, Notice of Allowance, dated Jul. 18, 2013, 12 pages.
U.S. Appl. No. 13/102,665, Final Office Action, dated Jul. 9, 2013, 17 pages.
U.S. Appl. No. 13/107,742, Final Office Action, dated Jul. 3, 2013, 19 pages.
Notice of Allowance for U.S. Appl. No. 11/977,437 dated Jul. 10, 2013, 10 pages.
U.S. Appl. No. 12/548,187, Non-Final Office Action dated Feb. 6, 2014, 54 pages.
U.S. Appl. No. 12/548,281, Non-Final Office Action dated Feb. 13, 2014, 16 pages.
U.S. Appl. No. 13/177,748, Final Office Action dated Mar. 20, 2014, 23 pages.
PCT Patent Application No. PCT/US2014/010832, International Search Report dated Apr. 3, 2014, 9 pages.
Agrawal et al., Efficient pattern matching over event streams, Proceedings of the 2008 ACM SIGMOD international conference on Management of data, Jun. 9-12, 2008, pp. 147-160.
Cadonna et al., Efficient event pattern matching with match windows, Proceedings of the $18^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.

(56) References Cited

OTHER PUBLICATIONS

Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 13/244,272, Notice of Allowance dated Aug. 12, 2013, 12 pages.
U.S. Appl. No. 11/601,415, Non-Final Office Action dated Dec. 11, 2013, 58 pages.
U.S. Appl. No. 12/396,464, Non Final Office Action dated Dec. 31, 2013, 16 pages.
U.S. Appl. No. 13/089,556, Non-Final Office Action dated Jan. 9, 2014, 14 pages.
Chandramouli et al., High-Performance Dynamic Pattern Matching over Disordered Streams, Proceedings of the VLDB Endowment, vol. 3, Issue 1-2, Sep. 2010, pp. 220-231.
Chapple, Combining Query Results with the UNION Command, ask.com Computing Databases, downloaded from: http://databases.about.com/od/sql/a/union.htm.
Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
U.S. Appl. No. 13/838,259, filed Mar. 15, 2013, Unpublished, Deshmukh et al.
U.S. Appl. No. 13/839,288, filed Mar. 15, 2013, Unpublished, Deshmukh et al.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance dated Jun. 22, 2012, 20 pages.
U.S. Appl. No. 12/396,464, Final Office Action dated May 16, 2014, 16 pages.
U.S. Appl. No. 12/548,187, Final Office Action dated Jun. 4, 2014, 64 pages.
U.S. Appl. No. 13/089,556, Final Office Action dated Jun. 13, 2014, 14 pages.
U.S. Appl. No. 13/107,742, Non-Final Office Action dated Jun. 19, 2014, 20 pages.
International Application No. PCT/US2011/052019, International Preliminary Report on Patentability dated Mar. 28, 2013, 6 pages.
International Application No. PCT/US2012/034970, International Preliminary Report on Patentability dated Nov. 21, 2013, 7 pages.
International Application No. PCT/US2012/036353, International Preliminary Report on Patentability dated Nov. 28, 2013, 6 pages.
U.S. Appl. No. 12/949,081, Non-Final Office Action dated Jan. 28, 2015, 20 pages.

U.S. Appl. No. 12/957,201, Notice of Allowance dated Jan. 21, 2015, 5 pages.
U.S. Appl. No. 13/107,742, Final Office Action dated Jan. 21, 2015, 23 pages.
U.S. Appl. No. 13/177,748, Non-Final Office Action dated Feb. 3, 2015, 22 pages.
U.S. Appl. No. 13/770,961, Non-Final Office Action dated Feb. 4, 2015, 22 pages.
U.S. Appl. No. 13/770,969, Notice of Allowance dated Jan. 22, 2015, 5 pages.
U.S. Appl. No. 13/829,958, Non-Final Office Action dated Dec. 11, 2014, 15 pages.
U.S. Appl. No. 13/906,162, Non-Final Office Action dated Dec. 29, 2014, 10 pages.
International Application No. PCT/US2014/010832, Written Opinion dated Dec. 15, 2014, 5 pages.
International Application No. PCT/US2014/010920, International Search Report and Written Opinion dated Dec. 15, 2014, 10 pages.
International Application No. PCT/US2014/017061, Written Opinion dated Feb. 3, 2015, 6 pages.
International Application No. PCT/US2014/039771, International Search Report and Written Opinion dated Sep. 24, 2014, 12 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Japan Patent Office office actions JPO patent application JP2013-529376 (dated Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.

(56) References Cited

OTHER PUBLICATIONS

Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
Cranor et al. "Gigascope: a stream database for network applications," Proceedings of the 2003 ACM SIGMOD international conference on Management of data, pp. 647-651 (Jun. 2003).
International Application No. PCT/US2014/068641, International Search Report and Written Opinion dated Feb. 26, 2015, 11 pages.
European Patent Application No. 12783063.6, Extended Search Report dated Mar. 24, 2015, 6 pages.
International Application No. PCT/US2014/039771, International Search Report and Written Opinion dated Apr. 29, 2015 6 pages.
International Application No. PCT/US2015/016346, International Search Report and Written Opinion dated May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (dated Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Action for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
Non-Final Office Action for U.S. Appl. No. 12/913,636 dated Apr. 1, 2015, 22 pages.
Notice of Allowance for U.S. Appl. No. 13/839,288 dated Apr. 3, 2015, 12 pages.
Bestehorn Fault-tolerant query processing in structured P2P-systems, Springer Science+Business Media LLC Distrib Parallel Databases 28:33-66 (May 8, 2010).
Cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the 22$^{nd}$ International Technical Meeting of the Satellite Division of the Institute of Navigation (ION GNSS 2009). (Sep. 25, 2009) pp. 538-546.
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
International Preliminary Report on Patentabiilty dated Jun. 16, 2016 for PCT/US2014/068641, 7 pages.
International Application No. PCT/RU2015/000468, International Search Report and Written Opinion dated Apr. 25, 2016, 9 pages.

(56) References Cited

OTHER PUBLICATIONS

International Application No. PCT/US2015/016346, International Search Report and Written Opinion dated May 24, 2016, 5 pages.
China Patent Office office action for patent application CN201180053021.4 (dated May 27, 2016).
Final Office Action for U.S. Appl. No. 13/830,759 dated Feb. 18, 2016, 18 pages.
Japan Patent Office office actions JPO patent application JP2014-509315 (dated Mar. 15, 2016).
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Kitagawa et al., Sensing Network, Information Processing, Information Processing Society of Japan, Sep. 15, 2010, vol. 51, No. 9, pp. 1119-1126.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
China Patent Office office actions for patent application CN201280022008.7 (dated Dec. 3, 2015).
European Application No. 12783063.6, Office Action dated Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages. (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Mahlke et al., Comparison of Full and Partial Predicated Execution Support for ILP Processors, ICSA '95, Santa Margherita Ligure, 1995, pp. 138-149.
U.S. Appl. No. 14/079,538, Final Office Action dated Jul. 27, 2016, 28 pages.
U.S. Appl. No. 14/883,815, Notice of Allowance dated Aug. 30, 2016, 13 pages.
U.S. Appl. No. 13/764,560, Notice of Allowance dated Sep. 30, 2016, 10 pages.
International Application No. PCT/US2015/016346, International Preliminary Report on Patentability dated Sep. 30, 2016, 6 pages.
PCT Written Opinion dated Aug. 18, 2016 for PCT/US2015/051268, 7 Pages.
U.S. Appl. No. 13/829,958, Final Office Action dated Jun. 26, 2017, 22 pages.
U.S. Appl. No. 13/830,378, Non-Final Office Action dated Jul. 5, 2017, 44 pages.
U.S. Appl. No. 13/838,259, Final Office Action dated Jul. 7, 2017, 69 pages.
U.S. Appl. No. 14/036,500, Notice of Allowance dated Jun. 30, 2017, 14 pages.
U.S. Appl. No. 14/036,659, Non-Final Office Action dated Jun. 2, 2017, 28 pages.
U.S. Appl. No. 14/559,550, Final Office Action dated Jul. 12, 2017, 21 pages.
U.S. Appl. No. 14/621,098, Notice of Allowance dated May 3, 2017, 9 pages.
U.S. Appl. No. 14/755,088, Non-Final Office Action dated Jun. 14, 2017, 13 pages.
U.S. Appl. No. 15/003,646, Notice of Allowance dated May 19, 2017, 16 pages.
U.S. Appl. No. 15/015,933, Notice of Allowance dated May 17, 2017, 16 pages.
U.S. Appl. No. 15/360,650, Notice of Allowance dated Jul. 24, 2017, 13 pages.
Akama et al., Design and Evaluation of a Data Management System for Worm Data Processing, Journal of Information Processing, Information Processing Society of Japan, vol. 49, No. 2, Feb. 15, 2008, pp. 749-764.
Chinese Application No. 201380056012.X, Office Action dated Jun. 1, 2017, 22 pages (10 pages for the original document and 12 pages for the English translation).
Japanese Application No. 2015-534676, Office Action dated Jun. 27, 2017, 9 pages.
Sadana "Interactive Scatterplot for Tablets," The 12th International Working Conference on Advanced Visual Interfaces, available from https://vimeo.com/97798460 (May 2014).
U.S. Appl. No. 13/830,428, Non-Final Office Action dated Mar. 22, 2017, 25 pages.
U.S. Appl. No. 13/830,502, Non-Final Office Action dated Apr. 7, 2017, 28 pages.
U.S. Appl. No. 14/036,500, Non-Final Office Action dated Feb. 9, 2017, 34 pages.
U.S. Appl. No. 14/079,538, Non-Final Office Action dated Mar. 31, 2017, 24 pages.
U.S. Appl. No. 15/360,650, Non-Final Office Action dated Mar. 9, 2017, 34 pages.

(56) References Cited

OTHER PUBLICATIONS

U.S. Appl. No. 13/830,735, Non-Final Office Action dated Apr. 4, 2017, 16 pages.
U.S. Appl. No. 15/177,147, Non-Final Office Action dated Apr. 7, 2017, 12 pages.
U.S. Appl. No. 14/866,512, Non-Final Office Action dated Apr. 10, 2017, 24 pages.
U.S. Appl. No. 14/610,971, Notice of Allowance dated Apr. 12, 2017, 11 pages.
China Patent Application No. CN201480030482.3, Office Action dated Feb. 4, 2017, 5 pages.
Map Reduce, Wikipedia, The Free Encyclopedia, 2016, 11 pages.
Pig (programming tool), Wikipedia, The Free Encyclopedia, 2016, 4 pages.
Olston et al., Pig Latin, A Not-So-Foreign Language for Data Processing, 2008, 12 pages.
Yang et al., Map-Reduce-Merge, Simplified Relational Data Processing on Large Clusters, 2007, 12 pages.
U.S. Appl. No. 13/829,958 Non-Final Office Action, dated Dec. 27, 2016, 20 pages.
U.S. Appl. No. 13/838,259 Non-Final Office Action, dated Jan. 4, 2017, 65 pages.
U.S. Appl. No. 14/610,971 Non-Final Office Action, dated Dec. 19, 2016, 10 pages.
U.S. Appl. No. 14/621,098 Non-Final Office Action, dated Nov. 14, 2016, 17 pages.
U.S. Appl. No. 15/003,646 Non-Final Office Action, dated Dec. 2, 2016, 9 pages.
U.S. Appl. No. 13/830,759, Non-Final Office Action dated Feb. 10, 2017, 23 pages.
U.S. Appl. No. 14/559,550, Non-Final Office Action dated Jan. 27, 2017, 16 pages.
U.S. Appl. No. 15/003,646, Non-Final Office Action dated Dec. 2, 2016, 9 pages.
U.S. Appl. No. 15/015,933, Non-Final Office Action dated Jan. 30, 2017, 11 pages.
International Application No. PCT/US2015/051268 International Preliminary Report on Patentability dated Dec. 8, 2016, 12 pages.
U.S. Appl. No. 13/829,958, Non-Final Office Action dated Jan. 8, 2018, 22 pages.
U.S. Appl. No. 13/830,735, Notice of Allowance dated Jan. 26, 2018, 9 pages.
U.S. Appl. No. 13/838,259, Non-Final Office Action dated Nov. 27, 2017, 69 pages.
U.S. Appl. No. 14/036,659, Notice of Allowance dated Nov. 30, 2017, 13 pages.
U.S. Appl. No. 14/079,538, Final Office Action dated Nov. 16, 2017, 26 pages.
U.S. Appl. No. 14/559,550, Notice of Allowance dated Dec. 5, 2017, 6 pages.
U.S. Appl. No. 14/973,377, Non-Final Office Action dated Nov. 30, 2017, 17 pages.
Chinese Application No. 201480004736.4, Office Action dated Nov. 29, 2017, 13 pages (7 pages of English translation and 6 pages of Original document).
Japanese Application No. 2015-534676, Office Action dated Jan. 23, 2018, 10 pages (1 page of English translation and 9 pages of Original document).
Japanese Application No. 2015-552765, Office Action dated Dec. 5, 2017, 3 pages (1 page of English translation and 2 pages of Original document).
Japanese Application No. 2015-552781, Office Action dated Nov. 21, 2017, 3 pages.
Japanese Application No. 2015-558217, Office Action dated Jan. 9, 2018, 4 pages (1 page of English translation and 3 pages of Original document).
U.S. Appl. No. 13/830,428, Final Office Action dated Oct. 5, 2017, 33 pages.
U.S. Appl. No. 13/830,735, Final Office Action dated Sep. 29, 2017, 16 pages.
U.S. Appl. No. 14/037,153, Non-Final Office Action dated Aug. 10, 2017, 45 pages.
U.S. Appl. No. 14/755,088, Notice of Allowance dated Oct. 11, 2017, 5 pages.
U.S. Appl. No. 14/861,687, Non-Final Office Action dated Oct. 11, 2017, 10 pages.
U.S. Appl. No. 14/866,512, Final Office Action dated Sep. 13, 2017, 25 pages.
U.S. Appl. No. 15/177,147, Non-Final Office Action dated Nov. 3, 2017, 6 pages.
Japanese Application No. 2015-534678, Office Action dated Aug. 29, 2017, 3 pages.
Japanese Application No. 2015-534680, Office Action dated Aug. 22, 2017, 10 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance dated Sep. 3, 2014, 7 pages.
U.S. Appl. No. 12/548,187, Advisory Action dated Sep. 26, 2014, 6 pages.
U.S. Appl. No. 12/548,281, Final Office Action dated Aug. 13, 2014, 19 pages.
U.S. Appl. No. 12/913,636, Non-Final Office Action dated Jul. 24, 2014, 22 pages.
U.S. Appl. No. 12/957,201, Non-Final Office Action dated Jul. 30, 2014, 12 pages.
U.S. Appl. No. 13/764,560, Non Final Office Action dated Sep. 12, 2014, 23 pages.
U.S. Appl. No. 13/770,969, Non Final Office Action dated Aug. 7, 2014, 9 pages.
U.S. Appl. No. 14/302,031, Non-Final Office Action dated Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion dated Jul. 16, 2014, 12 pages.
International Application No. PCT/US2013/062050, International Search Report & Written Opinion dated Jul. 2, 2014, 13 pages.
International Application No. PCT/US2013/062052, International Search Report & Written Opinion dated Jul. 3, 2014, 12 pages.
International Application No. PCT/US2013/073086, International Search Report and Written Opinion dated Mar. 14, 2014.
International Application No. PCT/US2014/017061, International Search Report and Written Opinion dated Sep. 9, 2014, 12 pages.
Rao et al., Compiled Query Execution Engine using JVM, ICDE '06, Atlanta, GA, Apr. 3-7, 2006, 12 pages.

(56) References Cited

OTHER PUBLICATIONS

Ray et al., Optimizing complex sequence pattern extraction using caching, data engineering workshops (ICDEW) 2011 IEEE 27th international conference on Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., Leo—DB2's LEarning Optimizer, Proc. of the VLDB, Roma, Italy, Sep. 2001, pp. 19-28.
U.S. Appl. No. 15/177,147, Notice of Allowance dated Mar. 22, 2018, 7 pages.
U.S. Appl. No. 13/830,428, Notice of Allowance dated Apr. 2, 2018, 9 pages.
U.S. Appl. No. 13/830,502, Notice of Allowance dated Apr. 2, 2018, 8 pages.
Chinese Application No. CN201380063379.4, Office Action dated Feb. 2, 2018 12 pages with translation.
International Patent Application PCT/RU2015/000468, International Preliminary Report on Patentability dated Feb. 8, 2018, 9 pages.
Chinese Application No. 201480004731.1, Office Action dated Apr. 4, 2018, 13 pages (6 pages of the original document and 7 pages For the English translation).
Chinese Application No. 201480009223.2, Office Action dated Apr. 18, 2018, 18 pages (10 pages of the original document and 8 pages for the English translation).
Chinese Application No. CN201380056017.2, Office Action dated May 11, 2018, 8 pages.
European Application No. 13776641.6, Office Action dated Apr. 3, 2018, 5 pages.
European Application No. EP13776642.4, Office Action dated May 3, 2018, 5 pages.
European Application No. EP13776643.2, Office Action dated May 3, 2018, 4 pages.
Japanese Application No. JP2015-558217, Office Action dated May 29, 2018, 4 pages.
Japanese Application No. 2015-534678, Office Action dated Apr. 24, 2018, 4 pages (3 pages of the original document and 1 page for the English translation).
Japanese Application No. JP2016-516778, Office Action dated May 22, 2018, 8 pages.
U.S. Appl. No. 13/830,378, Final Office Action dated May 1, 2018, 30 pages.
U.S. Appl. No. 14/037,153, Final Office Action dated May 3, 2018, 16 pages.
U.S. Appl. No. 14/973,377, Notice of Allowance dated May 2, 2018, 8 pages.
U.S. Appl. No. 15/795,121, Non-Final Office Action dated Apr. 6, 2018, 21 pages.
U.S. Appl. No. 14/861,687, Notice of Allowance dated Jun. 6, 2018, 10 pages.

* cited by examiner

PARAMETERIZED CONTINUOUS QUERY TEMPLATES

CROSS REFERENCES TO RELATED APPLICATIONS

The present application is a non-provisional of and claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING, the entire contents of which are incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Techniques for providing parameterized continuous query templates are described. According to at least one example, a computing system may receive a selection of one or more business logic templates. The selected business logic templates may indicate at least a type of template for generating a corresponding type of continuous query for the user. In some examples, the computing system may also receive, via the selected template, business event parameters associated with a user. The computing system may also generate based at least in part on the selections of the one or more business logic templates and the business event parameters associated with the user, a continuous query for retrieving business event data of the user. The type of the template may be an alert template type, a duplicate detection template type, an event count monitoring template type, a missing event detection template type, a trending detection template type, a top N item detection template type, and/or a moving aggregation template type. Further, in some examples, the alert template may include at least a key performance indicator alert template.

The computing system may also execute the generated continuous query to retrieve the business event data of the user. The computing system may also provide, via a user interface, display of the retrieved business event data of the user. Additionally, in some examples, the computing system may provide a user interface for selecting from among the one or more business logic templates prior to receiving the selection of the one or more business logic templates or the business event parameters. The continuous query may be configured to process streaming data or relation data (e.g., an archived relation). The relation data may include at least an unordered, time-varying set of tuples associated with the business event data of the user. The continuous query may be configured as a flat query or a group query. Further, the selection of the one or more business logic templates may include at least receiving a user-defined template.

According to at least one example, a computer-readable memory may store instructions that, when executed by one or more processors, may cause the one or more processors to receive selection of one of a plurality of continuous query types. Additionally, the instructions may also cause the one or more processors to provide, based at least in part on the received selection, a continuous query template corresponding to the selected continuous query type. Additionally, the instructions may also cause the one or more processors to receive, via the provided continuous query template, business event parameters. Further, the instructions may also cause the one or more processors to generate a continuous query based at least in part on the business event parameters and the continuous query template. In some examples, the instructions may also cause the one or more processors to provide a different respective interface for at least a subset of the plurality of continuous query types. The continuous query templates may include an alert template, a duplicate detection template, an event count monitoring template, a missing event detection template, a trending detection template, a top N item detection template, and/or a moving aggregation template. The continuous query may also be configured to enable retrieval of data from a stream or a relation.

According to at least one example, a computer-implemented method may include providing a user interface configured to enable selection from a plurality of business event query template types. The method may also include receiving selection of one of the plurality of business event query template types. Additionally, the method may include providing, based at least in part on the received selection, a query template corresponding to the selected business event query template type. The method may also include receiving, via the provided query template, business event parameters associated with user data. In some aspects, the method may also include generating a continuous query based at least in part on the received business event parameters and the query template and processing the user data based at least in part on the generated continuous query. In some aspects, processing the user data may include at least receiving the user data from a stream or based at least in part on a relation. Additionally, in some examples, the method may include providing the processed user data in a user interface configured for active display. The method may also include dynamically loading a workflow at least in response to the received selection, and wherein generating the continuous query includes at least implementing the workflow based at least in part on the business event parameters. Further, in some cases, the method may also include providing a natural language statement for identifying functionality of the continuous query.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
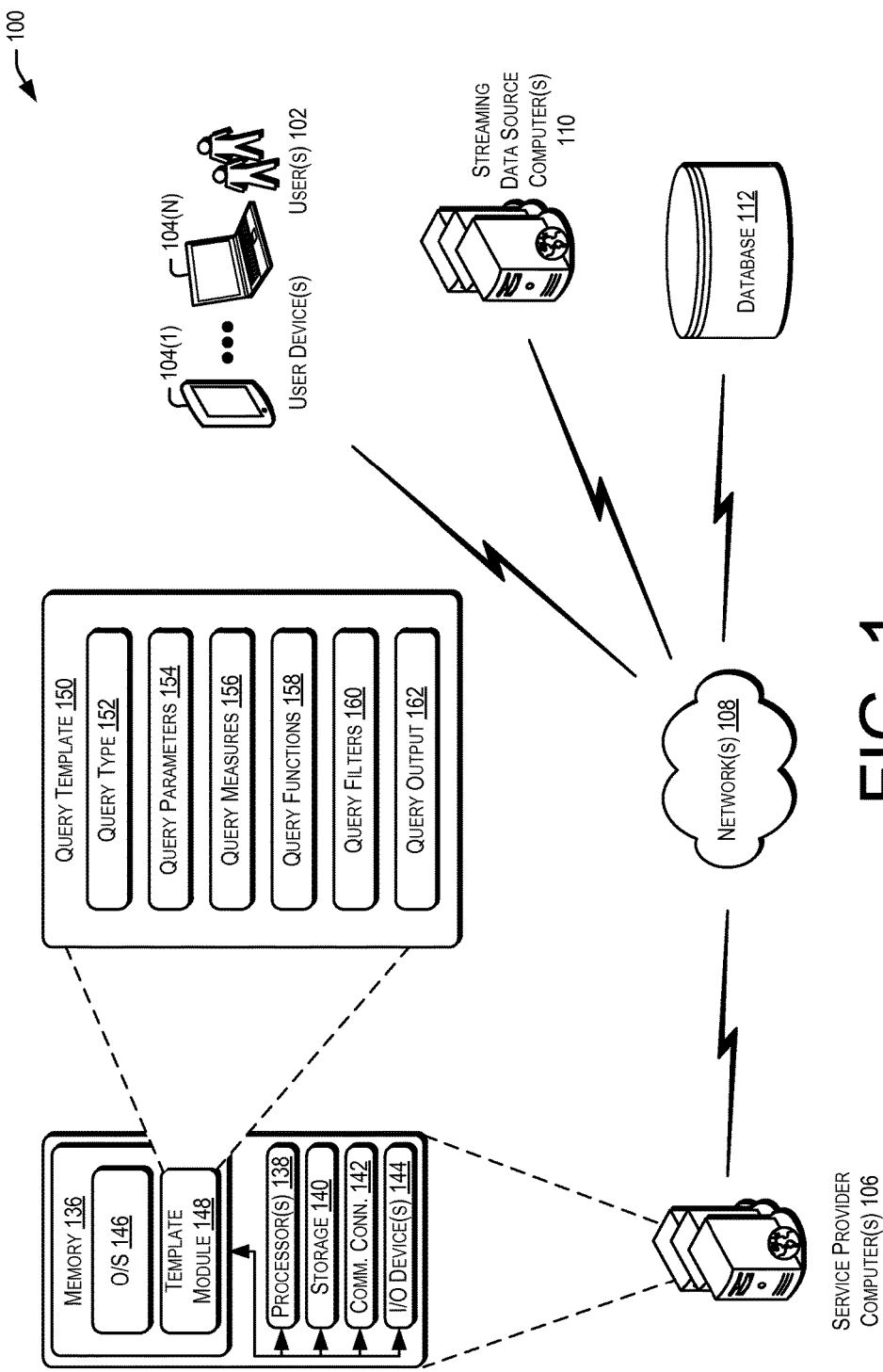
FIG. 1 is a simplified block diagram illustrating an example architecture for managing the parameterized continuous query templates, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing and/or providing parameterized continuous query templates. In some examples, parameterized UI templates may be utilized. The UI templates may include self-describing context for detection scenarios. The templates may work with both stream and relational sources. In some aspects, a business query may take a Data Object as input and create corresponding continuous query language (CQL) views and/or queries from it.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

---
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
---

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

In some examples, a continuous query may include a query configured to receive and/or process in-flight and/or real-time streaming data. Additionally, continuous queries may be utilized to analyze, monitor, and/or forecast complex business data that can help companies achieve "right time" decisions. With the continuous query abstraction, users can utilize the UI templates to create a continuous query without being requested to understand how to code. Under the cover, the generated CQL are registered to a continuous query service (hereinafter, "CQ Serivce." In some aspects, a CQ Service e is a facade for a CQL engine which is responsible for running the continuous queries.

A traditional ad-hoc query builder can be configured to act as a business query builder. A user can set most of the artifacts in a CQL query, such as project list, aggregation functions, group by fields, time window, etc. It may help the user to create a simple format CQL query but in most cases, it's still too difficult for the business users. Continuous query templates, on the other hand, can help a user to create a rather complex CQL query to perform one or more specific functions without knowing the detail CQL constructs. For example, a key performance (KPI) alert template can help a user to create CQL query for generating an alert event when a given moving KPI (temporal) measure is out of the constraints. Additionally, a missing events template may help a user to create a CQL query for detecting missing events with a specific pattern. Users may only need to make a few selections in the template to build a complex CQL statement. Additionally, an event engine may also take continuous query's output as an input for the alerting system. A continuous query may provide the query information as a modifier.xml for an event engine or service provider. Further, a trending detection template can help a user create a CQL to monitor the events trending up or down over a period of time instead of a single discrete point, and can also help to create an alert when a give measure trending is out of a specific range.

In some examples, there may be at least two different kinds of data sources for a CQL query including, but not limited to, a stream (e.g., archived) and a relation (e.g., archived). In some examples, a stream may be at least one principle source of data that CQL queries can act on. A stream S, may be a bag (i.e., a multi-set) of elements (s, T), where "s" is in the schema of S and T is in the time domain. In some aspects, stream elements may be tuple-time-stamp pairs, which can be represented as a sequence of time-stamped tuple insertions. In other words, a stream may be a sequence of time-stamped tuples. In some cases, there may be more than one tuple with the same time-stamp. The tuples of an input stream may be expected to arrive at the system in the order of increasing time-stamps. A relation may be time varying and may be defined as a mapping from the time domain to an unbounded multi-set (otherwise referred to as a "bag") of tuples to the schema of the relation. The relation may be an unordered, time-varying bag of tuples. As such, a relation may also be referred to as an instantaneous relation. In some examples, at every instant of time, a relation may be a bounded set. It may also be represented as a sequence of time-stamped tuples that can include insertions, deletions, and/or updates to capture the changing state of the relation. Like streams, relations may have a fixed schema to which all tuples within the relation conform.

In some examples, according to the functionality, a CQL query may take different types of data sources as input. For example, missing events and duplicate detection templates may request a stream type data source as input. Additionally, in some examples, a service provider may utilize data objects as data sources for both CQL queries and structured query language (SQL) queries. To support both streams and relations as inputs for CQL queries, the data object type may be specified and/or created. In general, a Stream Data Object may be a data source on which a user can do insert actions. And, in some examples, a Relation Data Object may be a data source on which a user can do insert, update, and delete actions. When a user creates the data object, its type may be specified by the user and/or automatically by the service provider. In some examples, the duplicate detection templates can only request a stream type data and missing events templates can use stream and relation type data.

Additionally, in some examples, operational intelligence (OI) may be a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns. Finally, OI is usually uses a push approach and it is usually based on continuous queries for real time actions.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI) in an incremental fashion. The CQL engine may utilize or understand temporal semantics and be configured to allow definition of a window of data (temporal) to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data over a period of moving time window.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement business logic in the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPIs may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

FIG. 1 depicts a simplified example system or architecture 100 in which techniques for managing the parameterized continuous query templates described herein may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112. The databases 112 may be relational databases, SQL servers, or the like and may, in some examples, manage archived relations on behalf of the users 102. Additionally, the databases 112 may receive or otherwise store data provided by the streaming data source computers 110. In some examples, the users 102 may utilize the user devices 104 to interact with the service provider computers 106 by providing queries or query statements and/or by requesting the generation of queries (e.g., based at least in part on templates as described herein). Such queries or query statements (provided by the users 102 or generated on the users' 102 behalf) may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of the parameterized continuous query templates described herein. Additionally, in some aspects, the service provider computers 106 may be configured as part of an integrated, distributed computing environment that includes the streaming data source computers 110 and/or the databases 112 as noted above.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a template module 148. As used herein, modules may refer to programming modules executed by servers or clusters of servers that are part of a service. In this particular context, the modules may be executed by the servers or clusters of servers that are part of the service provider computers 106. In some examples, the template module 148 may be configured to generate or otherwise provide a user interface configured to enable selection, configuration, implementation, etc., of one or more query templates 150. For example, the template module 148 may provide the query templates 150 for display on the user devices 104. The users 102 may be able to select from one or more query types 152 via the UI noted above. Additionally, in some examples, the UI may enable the users 102 to select or enter one or more query parameters 154, query measures 156, query functions 158, query filters 160, and/or query outputs 162.

In some examples, query types 152 may include, but are not limited to, KPI alert template types, duplicate detection template types, event count monitoring template types, missing event detection template types, trending detection template types, top N item listing template types, and/or moving aggregation template types. In some aspects, query parameters 154 may include any parameters of a query including, but not limited to, current system time, stream start time, data object names, tuple identifiers, descriptions, methods identifiers, or other information useful for defining or otherwise identifying portions of a query statement or streaming/relation data. Additionally, in some examples, query measures 156 may include, but are not limited to, any type of parameter or other information associated with a business event that is being measured or is to be measured by the user 102. Query functions 158 may include, but are not limited to, functions to be performed by the query (e.g., moving average, median, total, etc.). Further, query filters 160 may include, but are not limited to, identifiers of filtering tools or other methods of sorting, organizing, or otherwise enabling easier viewing and/or analysis of the data. Query outputs 162 may include data retrieved and/or process by the query (e.g., data selected from a database, acknowledgement of data posted, updated, or deleted from a database, or the like).

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
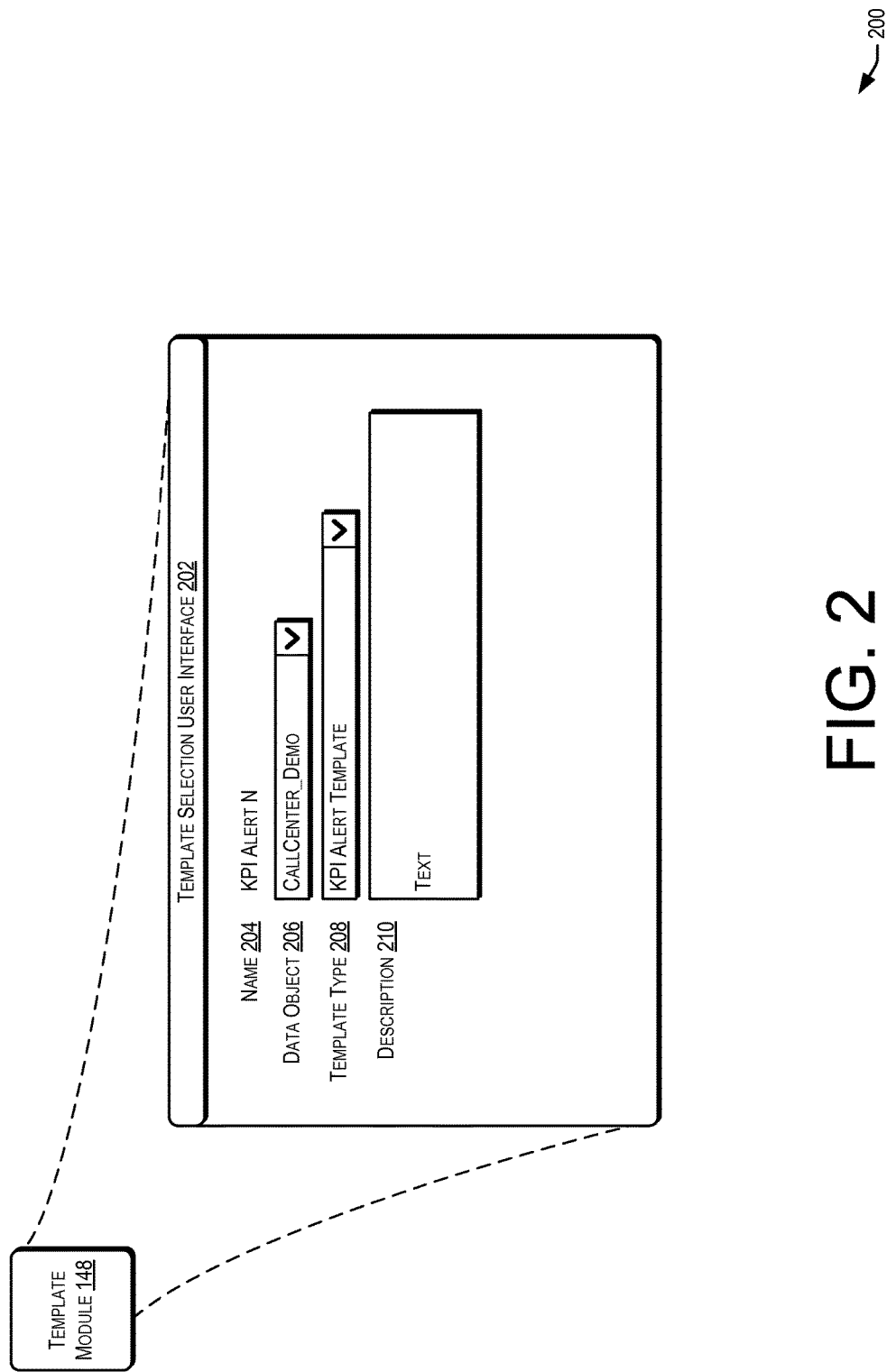
FIG. 2 is a simplified block diagram illustrating at least some features of the parameterized continuous query templates described herein, according to at least one example.

FIG. 2 depicts a simplified block diagram 200 with which features of the management of parameterized continuous query templates techniques may be described. In some examples, the template module 148 may be configured to provide a user interface for selecting from one or more templates or template types (e.g., the template selection UI 202). As used herein, a template type may indicate the type of a template. However, the template type may also be identified by the name of the template, which, in most cases will self-identify its type. For example, if a user selects the KPI template type, the UI 202 will provide a KPI template. In some examples, each template may have its own UI; however, in some examples, selection of the appropriate templates (i.e., the requested template) may be enabled via the template selection UI 202. Additionally, each individual template may be configured as taskflow (i.e., a workflow) which can be loaded dynamically when users 102 change the templates.

The template selection UI 202 may include several fields to aid in the selection of a template and/or preparation of the corresponding workflows. A name field 204 may be configured to display or otherwise indicate a name (e.g., entered by the user in this UI 202 or another UI) of the template being created. In this example, the name 204 has been selected, entered, or generated as "KPI Alert N" to indicate that a KPI alert template is being created. The name 204 may later be utilized to identify the query that is generated based at least in part on the query template. Additionally, in some examples, the template selection UI 202 may also include a data object selection area 206. The data object selection area 206 may include a drop-down box for displaying different data objects associated with the user 102 and/or a business process associated with the user 102. In this non-limiting example, the selected data object 206 may correspond to the "CallCenter_Demo" data object. Template types 208 may also be selected via a drop-down box of the template selection UI 202. As noted, the template types 208 may include KPI alert templates (as shown in FIG. 2) or any other template type that may correspond to a workflow for generating a continuous query. Further, the user 102 may be able to enter a description 210 of the template and/or of the continuous query to be generated by the template.

As noted above, many different types of templates may be provided. Some examples may include a KPI alert template. Utilizing such a query template, a user may define a KPI measure. In some examples, the measure may include an aggregation on a field. When the KPI measure falls out of the identified constraints, an alert may be provided to the user 102. The generated continuous query statements may be based at least in part on archived relations data objects (e.g., based at least in part on data from the streaming data source computers 110) and/or historical values (e.g., based at least in part on data from the database 112). Other examples of template types may include duplicate detection templates. The duplicate detection template may generate a continuous query configured to provide an alert if duplicate data is detected for a particular point in time. This template may work with archived relations and/or streams. However, in some examples, the duplicate detection template may only be used with archived streams.

An event count monitoring template type may include emitting an alert (e.g., on the hour) if there are less than a certain number of events within a period of time (e.g., every sixty minutes) for a particular account. Additionally, in some examples, a missing events detection template may detect and/or alert on missing events. For example, three different missing event patterns may be detected. The first pattern is called "bounded by events." This pattern implies a missing "approval." In this case, a missing "approval" may not need to be explicitly defined. The second pattern may describe "approval by exclusion" (i.e., events that are not "approv- als"). This approach may work if "other" event types can occur between an "order" and a "shipment." The third patter is called, and may be, "bounded by time." The trend detection template may be configured to detect trends (e.g., prices that fluctuate by more than a specified percentage or the like). Additionally, in some examples, a top N item template may list the top N items for an aggregation value during a period (e.g., sixty minutes) with an output after a second period (e.g., ten minutes). Examples may include, but are not limited to, listing the top three sales for shopping centers. Further, a moving aggregate template may be configured to calculate a moving statistical aggregation on a field. For example, a moving average of processing time may be calculated for the last sixty minutes, and output every ten minutes, utilizing this template. Other user-defined templates may also be configured to generate continuous queries and/or provide alerts based at least in part on definitions and/or configurations implemented or created by one or more users 102.

In some examples, there are at least three definitions for KPI alerts. The first is "measure," which may define what a user 102 wants to monitor. In common, it may be an aggregation for a column, for example average of price, sum of sales. The second definition is "threshold." It may define in which conditions the alert may be sent. The third definition is the "payload" of the alert event. It may define what property or values will be sent out in the alert event.

Figure 3:
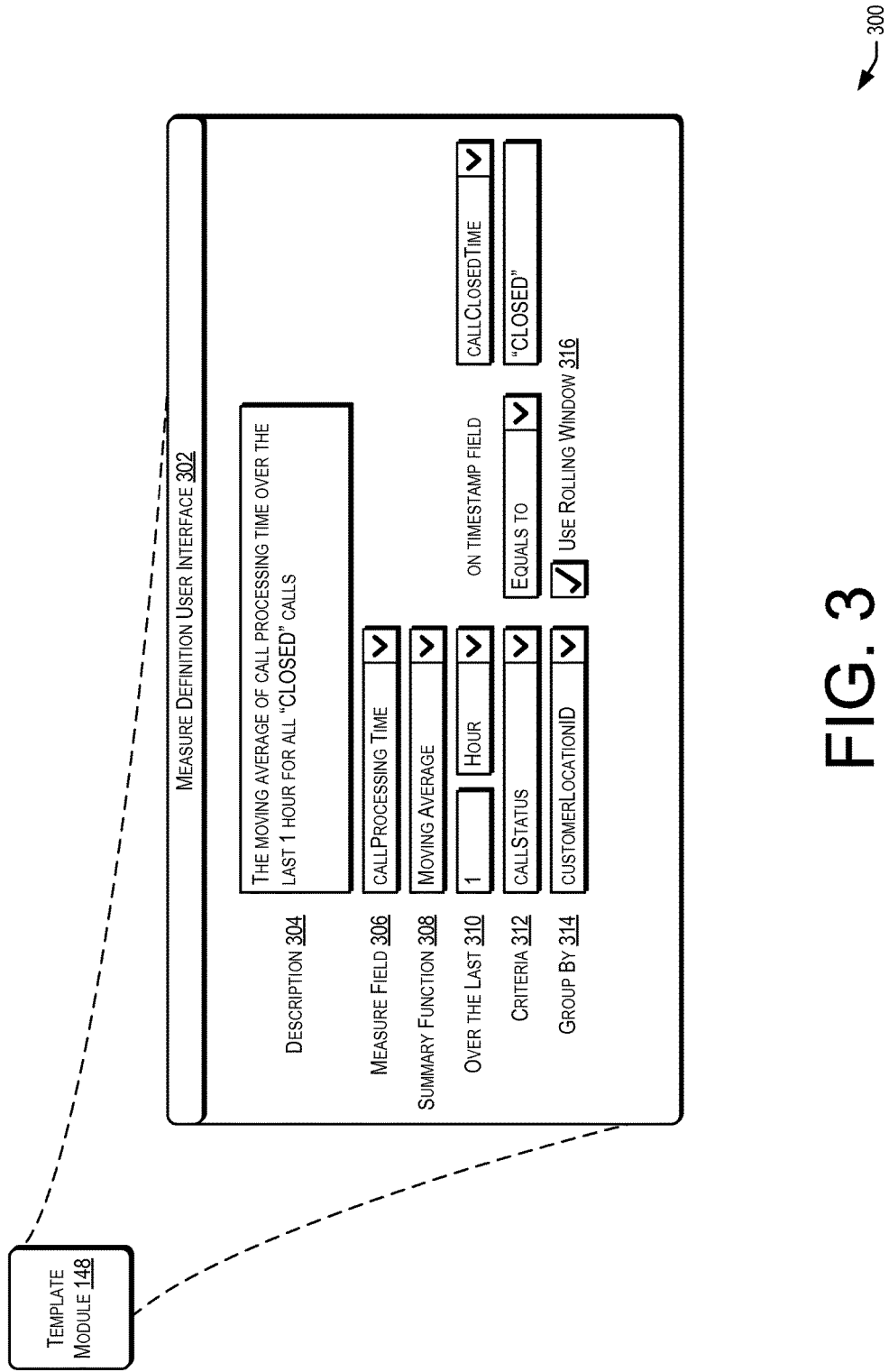
FIG. 3 is another simplified block diagram illustrating at least some additional features of the parameterized continuous query templates described herein, according to at least one example.

FIG. 3 depicts a simplified block diagram 300 for describing the measure definition UI 302 may be provided by the template module 148 of FIG. 1. In some examples, the measure definition UI 302 may be configured to enable parameterization of the template by the user 102. In some aspects, the user 102 may specify an aggregation on a column of a data object. The column may be a measure column. The aggregation may be calculated in a time window (e.g., one hour, twenty minutes, etc.). Also, the user 102 may set a couple of criteria conditions for the aggregation calculation. As seen, the measure definition UI 302 may enable adding a description 304, defining a measure 306, indicating a summary function 308, selecting a time window 310, selecting one or more criteria 312, selecting a group by type 314, and/or selecting whether to utilize a rolling window 316. Other features may also be selected associated with the rolling window selection 316, for example, a range length value and/or amount type (e.g., minutes, hours, etc.), an update interval value and/or amount type, and/or what the rolling window should be "based on" (e.g., call closed time, etc.).

Figure 4:
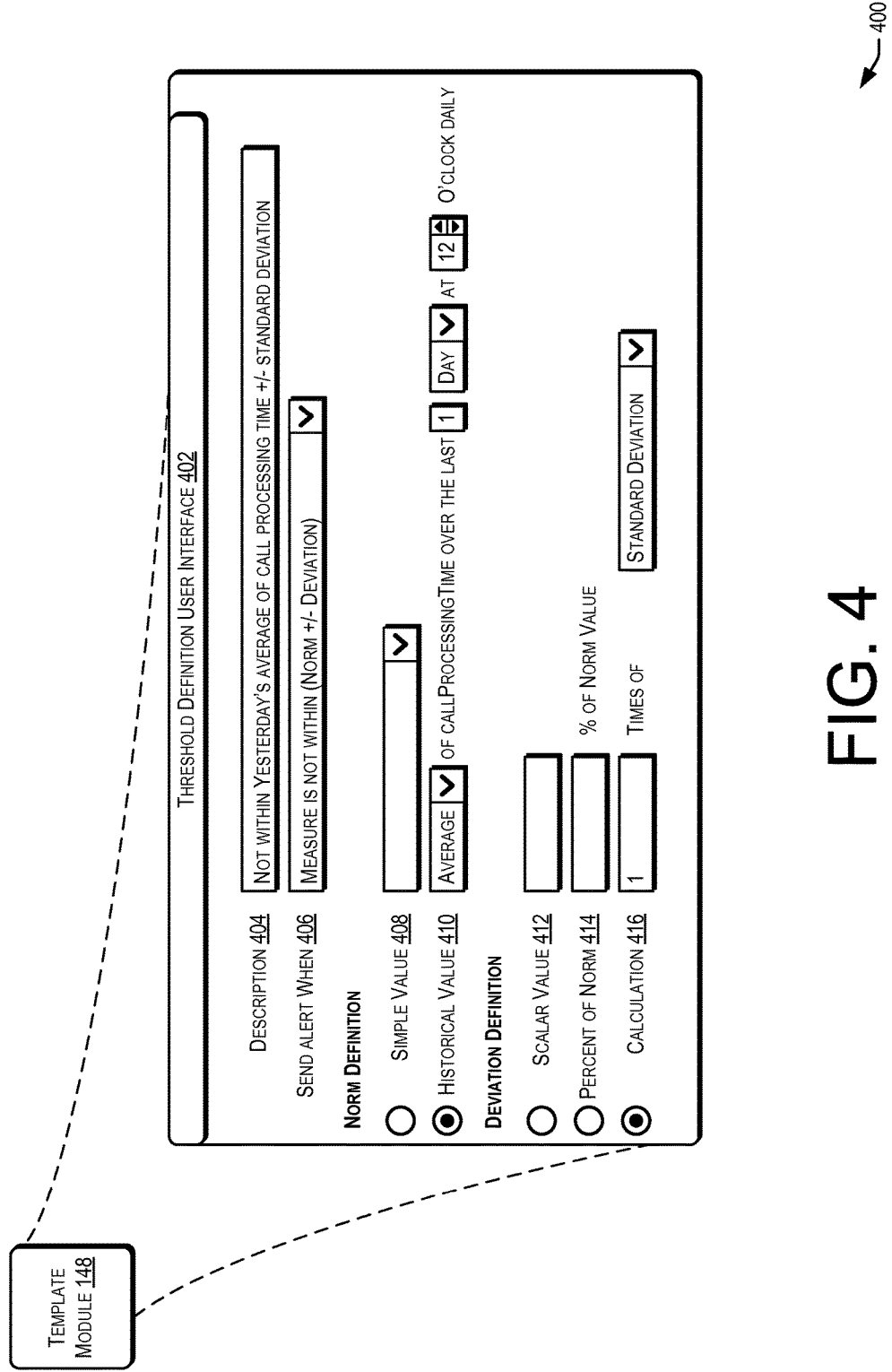
FIG. 4 is another simplified block diagram illustrating at least some additional features of the parameterized continuous query templates described herein, according to at least one example.

FIG. 4 depicts a simplified block diagram 400 for describing the threshold definition UI 402 may be provided by the template module 148 of FIG. 1. In some examples, the threshold definition UI 402 may be configured to enable parameterization of the template by the user 102. In some aspects, the user 102 may be enabled, via the UI 402, to enter a description 404 for the threshold and/or select between one or more threshold conditions 406 including, but not limited to, "measure is greater than Norm+Deviation," "measure is less than Norm−Deviation," and "measure is not within Norm+/−Deviation." In some examples, the Norm may be the normal value of the KPI measure. It could be a simple value 408, such as 10,000. It could also be calculated from historical values 410, for example average value of yesterday. To calculate the historical value 410, the user 102 may define the data set, for example all data of yesterday, all data from 2 o'clock to 3 o'clock. And, in some cases, the criteria would be the same as measure.

The Deviation may be the allowed deviation value for alerting. If the actual deviation of KPI measure is out of the allowed deviation, an alert event may be send. There may be three kinds of deviation. First, it could be a scalar value 412, for example 500. Second, it could be a fixed percent of the Norm value 414. Third, if the Norm value is calculated from historical value, it could be a calculated value 416 based at least in part on the same data set. For example, if the Norm value is yesterday's average, then the Deviation could be yesterday's standard deviation. Additionally, an alert event may include the output payload of an alert. In this case, it may include the norm value, the allowed deviation, the actual deviation, measure value, and/or any constants the user 102 defined, like the description 404. Further, A natural language statement may help users 102 to understand the query functionality better. The natural language statement may be a statement with hyperlinks. Those hyperlinks may refer the user 102 to the related properties editor. The user 102 can change the literal description of the hyperlinks, as desired.

Figure 5:
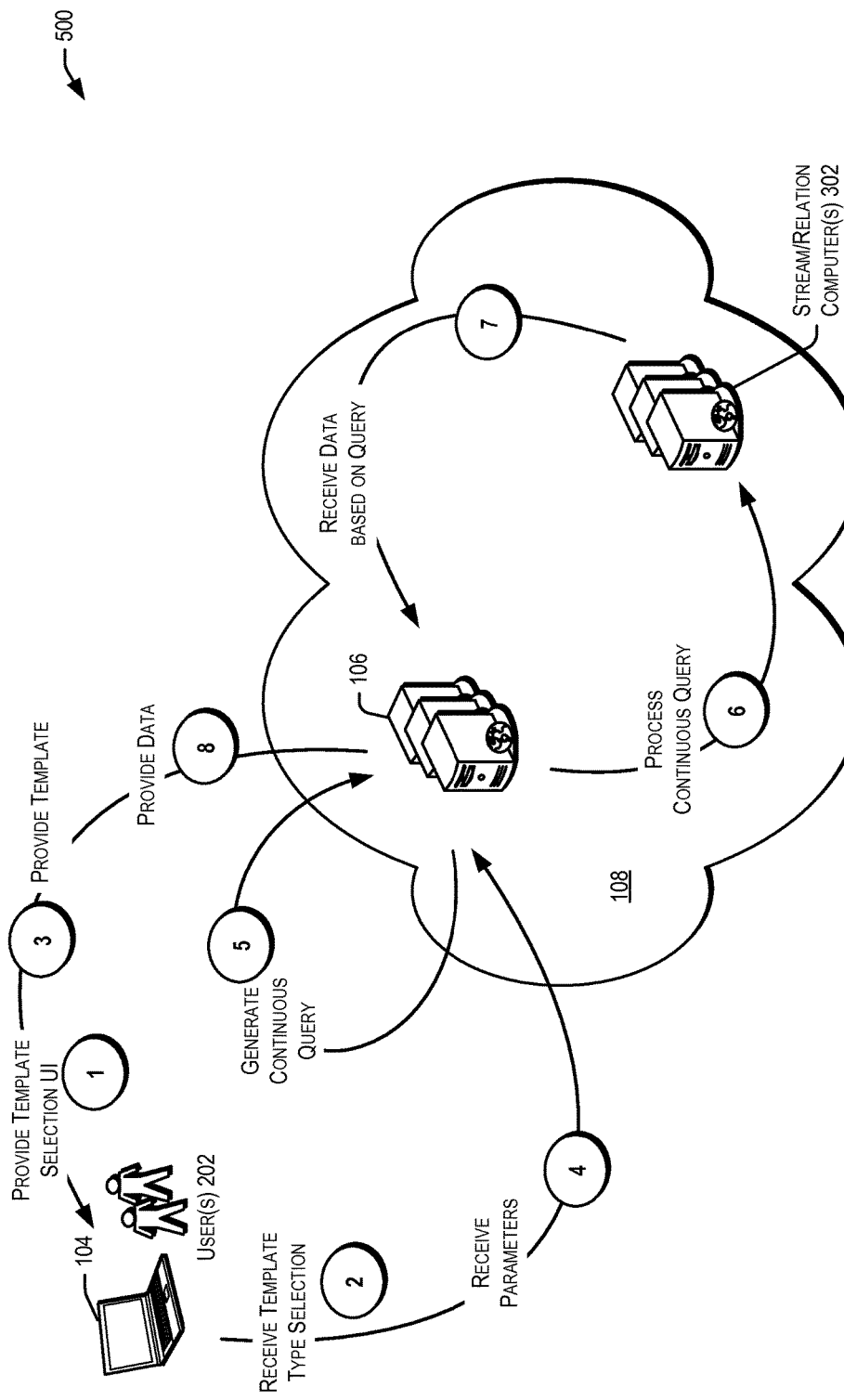
FIG. 5 is a simplified flow diagram illustrating at least some additional features of the parameterized continuous query templates described herein, according to at least one example.

FIG. 5 depicts a simplified flow diagram showing one or more techniques 500 for implementing the parameterized continuous query templates, according to one example. In FIG. 5, the service provider computers 106 are again shown in communication with the users 102 and/or user devices 104 via the networks 108. Additionally, in some examples, the service provider computers 106 may include or be in communication (e.g., via the networks 108) with one or more stream/relation computers 302 or stream/relation modules. While techniques 500 are shown in FIG. 5 in a particular order (including arbitrary sequence numbers), it should be understood that no particular order is necessary and that one or more steps or parts of the techniques 500 may be omitted, skipped, and/or reordered. In at least one non-limiting example, the one or more service provider computers 106 described above with reference to FIG. 1 may provide a template selection UI configured to enable the users 102 to select from a plurality of query templates. The service provider computers 106 may then receive, from the user devices 104, a template type selection indicating a particular template to be utilized for generating one or more continuous queries. As such, based at least in part on this select, the service provider computers 106 may then provide the corresponding template.

In some examples, the service provider computers 106 may then receive parameters, selections, etc., from the user devices 104 based at least in part on information provided through and/or selected from within the template. The service provider computes 106 may then generate a continuous query (e.g., utilizing a workflow) based at least in part on the workflow, the parameters provided by the user 102, and/or information of the template. Additionally, once the query is generated, the service provider computers 106 may be configured to process the continuous query on data of the stream/relation computers 302. The query may be performed based at least in part on a streaming data object and/or a relation. The service provider computers 106 may then receive data from the stream/relation computers 302 based at least in part on the continuous query performance, and provide the data to the user devices 104. In some aspects, providing the data may include generating a UI for visualization of active data (e.g., to simulate real-time changes within the stream and/or relation).

The service provider computers 106 may also issue query data definition languages (DDLs) to the CQ Service at runtime. As such, when a user 102 saves a continuous query, the service provider computers 106 may only need to generate Modifier.xml and store it into a metadata service (MDS). At runtime, if a user 102 opens a dashboard or starts an alerting which is based on the continuous query, a Report Cache may be able to read the continuous query configuration in MDS and get the Modifier.xml, with which it can generate the full CQL statement with security data filter predicates. In some aspects, each CQL statement may start with "execute physical" to indicate that it should be processed by the CQ Service. Additionally, in some cases, a user 102 may be able to start/stop continuous queries. The service provider computers 106 may be configured to provide these options on a UI (e.g., the UIs 202, 302, and/or 402). On the backend, the service provider computers 106 may be configured to issue DDLs to the CQ Service to start/stop a continuous query in progress. Further, some queries may be generated as flat queries and some may be generated as group queries. A flat query may not have any aggregation functions in the query, while a group query may include aggregations.

In some aspects, a user 102 may want to bind the output of a continuous query into a data object and do more further operation on it. In some cases, the service provider computers 102 may allow users 102 to do this. For example, when a user 102 finishes a query, and if he wants to bind the result into a data object, he has to define the mapping between project list and the outbound data object. On UI, there would be a tab for user to do the mapping.

Further, for alert systems, an event engine may be utilized. The event engine should know the output schema of the continuous query, at least the field name and type of the output payload, so that it can process the output event to raise an alert to the appropriate person. In one non-limiting example, the Event Engine may read the Modifier.xml to get the information of the query. Continuous query may then provide the similar xml for the Event Engine. Another reason for modifier is ReportCache, which may inject the CQL query into CQ Service at runtime. When a user 102 opens an active dashboard whereas real time data is being pushed to the dashboard, the ReportCache may add the row level security predicates into related CQL queries and inject it into CQ Service. So ReportCache may need a modifier to generate the CQL statement. The Modifier may have a type attribute to indicate whether it is a CQL modifier or a SQL modifier.

Figure 6:
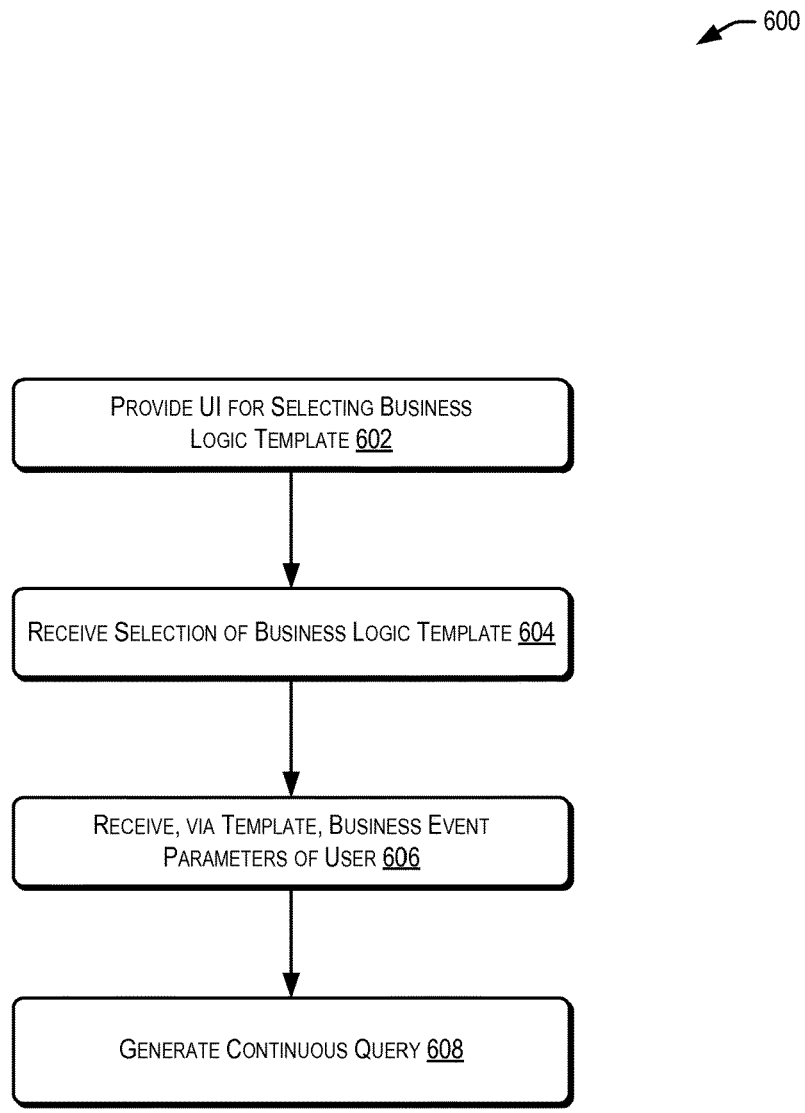
FIG. 6 is a simplified process flow illustrating at least some features of the parameterized continuous query templates described herein, according to at least one example.
Figure 7:
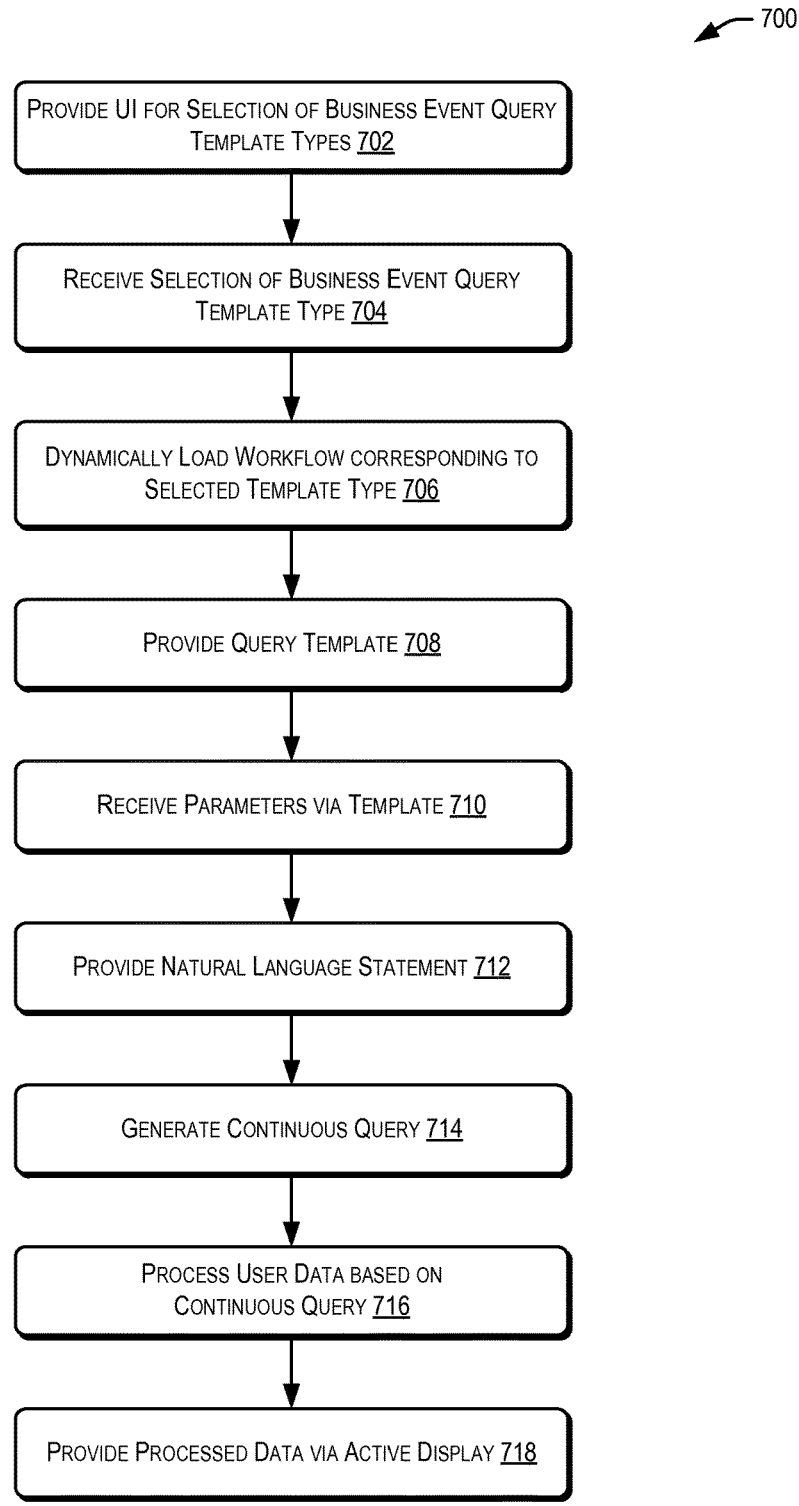
FIG. 7 is another simplified process flow illustrating at least some features of the parameterized continuous query templates described herein, according to at least one example.
Figure 8:
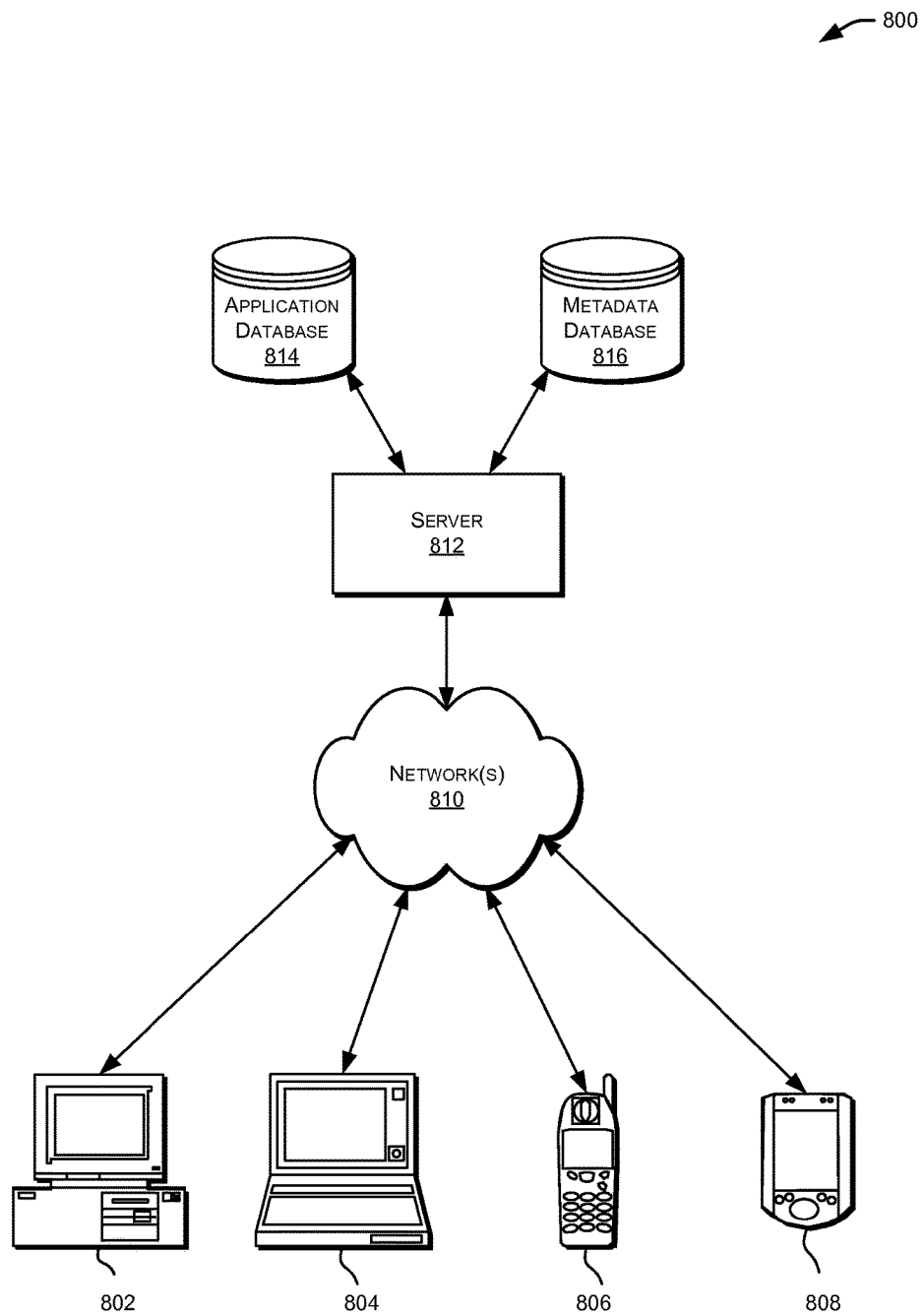
FIG. 8 is a simplified block diagram illustrating components of a system environment that may be used in accordance with an embodiment of the parameterized continuous query templates described herein, according to at least one example.

FIGS. 6-8 illustrate example flow diagrams showing respective processes 600, 700, and 800 for implementing the parameterized continuous query template techniques described herein. These processes 600, 700, 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the template module 148 of FIG. 1) shown in FIG. 1 may perform the process 600 of FIG. 6. The process 600 may begin by including providing a UI for selecting one or more business logic templates at 602. Business logic templates may include any template or template types described herein including, but not limited to, business event templates, or the like. At 604, the process 600 may include receiving selection of a business logic template for use with generating a continuous query. In some examples, the selection may be based at least in part on the user providing their selection at 602. At 606, the process 600 may include receiving, via a template, a business event parameter associated with the user and/or business events of the user. The process 600 may end at 608 by including generating a continuous query based at least in part on the type of template being used and/or the parameters entered into the template.

FIG. 7 illustrates an example flow diagram showing process 700 for implementing the parameterized continuous query template techniques described herein. The one or more service provider computers 106 (e.g., utilizing at least the template module 148 of FIG. 1) shown in FIG. 1 may perform the process 700 of FIG. 7. The process 700 may begin at 702 by including providing a UI for selection of business event query types. At 704, the process 700 may include receiving selection of one of the business event query template types. Additionally, the process 700 may also include dynamically loading a workflow corresponding to a selected template type at 706. At 708, the process 700 may include providing the query template to the user. As such, a template corresponding to the selected query type may be utilized by the user to generate or otherwise build a continuous query.

At 710, the process 700 may include receiving parameters via the template. At 712, the process 700 may include providing a natural language statement. The natural language statement may indicate the goal, plan, or functionality of the template being utilized. Additionally, in some examples, the process 700 may also include generating the continuous query based at least in part on the parameters, the selected template, and/or dynamically loaded workflow. At 716, the process 700 may include processing user data based at least in part on the continuous query. Further, at 718, the process 700 may end by including providing the processed data (e.g., retrieved and/or stored data) in an active display configured to show a user 102 one or more real-time changes in the user's business event data.

Illustrative methods and systems for implementing the fast path evaluation of Boolean predicates are described above. Some or all of these systems and methods may, but need not, be implemented at least partially by architectures and processes such as those shown at least in FIGS. 1-6 above.

FIG. 8 is a simplified block diagram illustrating components of a system environment 800 that may be used in accordance with an embodiment of the present disclosure. As shown, system environment 800 includes one or more client computing devices 802, 804, 806, 808, which are configured to operate a client application such as a web browser, proprietary client (e.g., Oracle Forms), or the like over one or more networks 810 (such as, but not limited to, networks similar to the networks 108 of FIGS. 1 and 3). In various embodiments, client computing devices 802, 804, 806, and 808 may interact with a server 812 over the networks 810.

Client computing devices 802, 804, 806, 808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, and 808 may be any other electronic device, such as a thin-client computer, Internet-enabled gaming system, and/or personal messaging device, capable of communicating over a network (e.g., network 810 described below). Although exemplary system environment 800 is shown with four client computing devices, any number of client computing devices may be supported. Other devices such as devices with sensors, etc. may interact with server 812.

System environment 800 may include networks 810. Networks 810 may be any type of network familiar to those skilled in the art that can support data communications using any of a variety of commercially-available protocols, including without limitation TCP/IP, SNA, IPX, AppleTalk, and the like. Merely by way of example, network 810 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 also includes one or more server computers 812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 800 may also include one or more databases 814, 816. Databases 814, 816 may reside in a variety of locations. By way of example, one or more of databases 814, 816 may reside on a non-transitory storage medium local to (and/or resident in) server 812. Alternatively, databases 814, 816 may be remote from server 812, and in communication with server 812 via a network-based or dedicated connection. In one set of embodiments, databases 814, 816 may reside in a storage-area network (SAN) familiar to those skilled in the art. Similarly, any necessary files for performing the functions attributed to server 812 may be stored locally on server 812 and/or remotely, as appropriate. In one set of embodiments, databases 814, 816 may include relational databases, such as databases provided by Oracle, that are adapted to store, update, and retrieve data in response to SQL-formatted commands.

Figure 9:
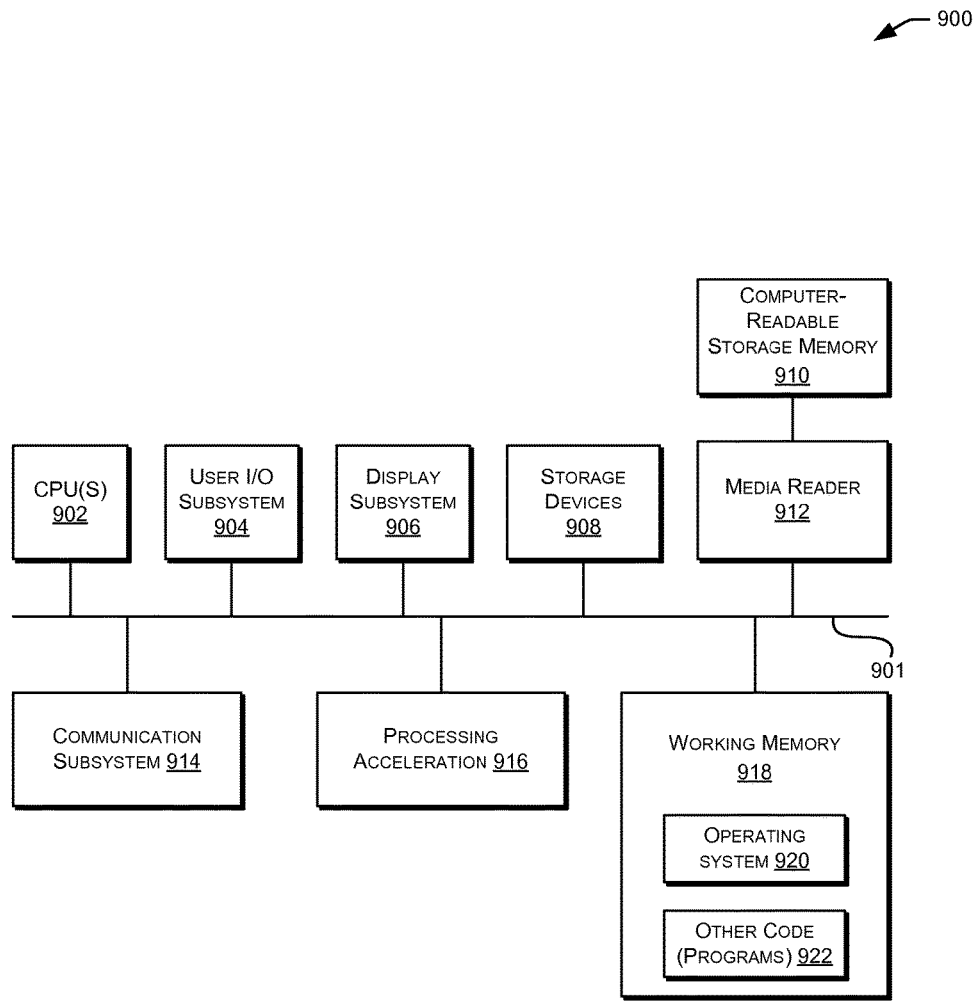
FIG. 9 is a simplified block diagram illustrating a computer system that may be used in accordance with embodiments of the parameterized continuous query templates described herein, according to at least one example.

FIG. 9 is a simplified block diagram of a computer system 900 that may be used in accordance with embodiments of the present disclosure. For example service provider computers 106 may be implemented using a system such as system 900. Computer system 900 is shown comprising hardware elements that may be electrically and/or communicatively coupled via a bus 901. The hardware elements may include one or more central processing units (CPUs) 902, one or more input devices 904 (e.g., a mouse, a keyboard, etc.), and one or more output devices 906 (e.g., a display device, a printer, etc.). Computer system 900 may also include one or more storage devices 908. By way of example, the storage device(s) 908 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 may permit data to be exchanged with network 912 and/or any other computer described above with respect to system environment 900.

Computer system 900 may also comprise software elements, shown as being currently located within working memory 918, including an operating system 920 and/or other code 922, such as an application program (which may be a client application, Web browser, mid-tier application, RDBMS, etc.). In an exemplary embodiment, working memory 918 may include executable code and associated data structures used for relying party and open authorization-related processing as described above. It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system comprising:
a memory storing a plurality of instructions; and
one or more processors configured to access the memory, wherein the one or more processors are further configured to execute the plurality of instructions to at least:

receive, via a first user interface, a selection of a business logic template from a plurality of business logic templates from a user, the selected business logic template indicating at least a type of template for generating a corresponding type of continuous query for the user, the selected business logic template comprising a Key Performance Indicator (KPI) alert template;

generate the selected business logic template by:
identifying one or more query parameters related to the selected business logic template, the set of one or more query parameters comprising at least one KPI measure that identifies a critical metric of an organization, and the at least one KPI measure specifying an aggregation on a column of a data object in the KPI alert template;
determining a set of one or more threshold parameters specifying one or more threshold conditions for the set of one or more query parameters; and
defining an alert event to be transmitted to the user when a value associated with a query parameter exceeds a threshold condition specified by the set of one or more threshold parameters associated with the at least one query parameter;

upon the generation of the selected business logic template, determine, from a set of input data source types, one or more compatible input data source types usable with the selected business logic template based at least in part on actions associated with the selected business logic template, the set of input data source types including a stream type data and a relation type data;

provide, via a second user interface, the set of one or more query parameters associated with the selected business logic template;

receive via the second user interface, a value associated with the at least one KPI measure from the set of one or more query parameters from the user;

receive via the second user interface, a user-selected input data source type of the one or more compatible input data source types;

provide, via a third user interface, the set of one or more threshold parameters for the at least one KPI measure, the set of one or more threshold parameters specifying the one or more threshold conditions for the at least one KPI measure;

receive, via the third user interface, one or more values associated with the set of one or more threshold parameters for the at least one KPI measure from the user;

generate a continuous query for retrieving business event data of the user based at least in part on the selected business logic template, the set of one or more query parameters associated with the selected business logic template, and the set of one or more threshold parameters, the continuous query configured to provide the alert event when the value associated with the at least one KPI measure exceeds the threshold condition specified by the set of one or more threshold parameters associated with the at least one KPI measure;

receive a request to save the generated continuous query;

generate an extensible markup language (XML) file configured to enable subsequent generation of the generated continuous query;

store the extensible markup language file; and execute the continuous query on an input data source of the user-selected input data source type to retrieve the business event data associated with the user.

2. The system of claim 1, wherein the one or more processors are further configured to execute the plurality of instructions to at least provide, via a fourth user interface, display of the retrieved business event data of the user.

3. The system of claim 1, wherein the type of template comprises at least one of a duplicate detection template type, an event count monitoring template type, a missing event detection template type, a trending detection template type, a top N item detection template type, or a moving aggregation template type.

4. The system of claim 1, wherein the one or more processors are further configured to execute the plurality of instructions to at least:
receive a request to open an active dashboard for presenting the business event data of the user; and
enable a report cache to retrieve the extensible markup language file from a metadata service configured to store the extensible markup language file.

5. The system of claim 1, wherein the one or more processors are further configured to execute the plurality of instructions to at least provide a user interface for selecting from among the one or more business logic templates prior to receiving the selection of the one or more business logic templates or the business event parameters.

6. The system of claim 1, wherein the input data source is an archived relation data object containing an unordered, time-varying set of tuples associated with the business event data of the user.

7. The system of claim 1, wherein the continuous query is configured as a flat query or a group query.

8. The system of claim 1, wherein selection of the one or more business logic templates includes at least receiving a user-defined template.

9. A non-transitory computer-readable memory storing a plurality of instructions executable by one or more processors, the plurality of instructions comprising:
instructions that cause the one or more processors to at least receive, via a first user interface, a selection of a continuous query type from a plurality of continuous query types from a user;
instructions that cause the one or more processors to generate, based at least in part on the received selection, a continuous query template corresponding to the selected continuous query type, the continuous query template comprising a Key Performance Indicator (KPI) alert template, the instructions to generate the continuous query template further comprising:
instructions that cause the one or more processors to identify a set of one or more query parameters related to the selected continuous query type, the set of one or more query parameters comprising at least one KPI measure that identifies a critical metric of an organization, and the at least one KPI measure specifying an aggregation on a column of a data object in the KPI alert template;
instructions that cause the one or more processors to determine a set of one or more threshold parameters specifying one or more threshold conditions for the set of one or more query parameters; and
instructions that cause the one or more processors to define an alert event to be transmitted to the user when a value associated with a query parameter exceeds a threshold condition specified by the set of one or more threshold parameters associated with the at least one query parameter;

instructions that cause the one or more processors to determine, upon the generation of the continuous query template, one or more compatible input data source types, from a set of input data source types, usable with the continuous query template based at least in part on actions associated with the continuous query template, the set of input data source types including a stream type data and a relation type data;

instructions that cause the one or more processors to provide, via a second user interface, the set of one or more query parameters associated with the continuous query template;

instructions that cause the one or more processors to at least receive, via the second user interface, a value associated with the at least one KPI measure from the set of one or more query parameters from the user;

instructions that cause the one or more processors to at least receive, via the second user interface, a user-selected input data source type of the one or more compatible input data source types;

instructions that cause the one or more processors to provide, via a third interface, the set of one or more threshold parameters for the at least one KPI measure, the set of one or more threshold parameters specifying the one or more threshold conditions for the at least one KPI measure;

instructions that cause the one or more processors to receive, via the third user interface, one or more values associated with the set of one or more threshold parameters for the at least one KPI measure from the user;

instructions that cause the one or more processors to at least generate a continuous query based at least in part on the set of one or more query parameters, the set of one or more threshold parameters, and the continuous query template, the continuous query configured to provide the alert event when the value associated with the at least one KPI measure exceeds the threshold condition specified by the set of one or more threshold parameters associated with the at least one KPI measure;

instructions that cause the one or more processors to at least receive a request to save the generated continuous query;

instructions that cause the one or more processors to at least generate an extensible markup language (XML) file configured to enable subsequent generation of the generated continuous query;

instructions that cause the one or more processors to at least store the extensible markup language file; and instructions that cause the one or more processors to execute the continuous query on an input data source of the user-selected input data source type to retrieve the business event data associated with the user.

10. The non-transitory computer-readable memory of claim 9, wherein the plurality of instructions further comprise instructions that cause the one or more processors to at least provide a different respective interface for at least a subset of the plurality of continuous query types.

11. The non-transitory computer-readable memory of claim 10, wherein the continuous query template includes at least one of an alert template, a duplicate detection template, an event count monitoring template, a missing event detection template, a trending detection template, a top N item detection template, or a moving aggregation template.

12. The non-transitory computer-readable memory of claim 9, wherein the input data source is an archived relation data object containing an unordered, time-varying set of tuples associated with the business event data of the user.

13. A computer-implemented method, comprising:
providing a first user interface configured to enable selection from a plurality of business event query template types from a user;

receiving selection of a business event query template type from the plurality of business event query template types, the selected business event query template type comprising a Key Performance Indicator (KPI) alert template;

generating the selected business event query template type by:
identifying a set of one or more query parameters related to the selected business event query template type, the set of one or more query parameters comprising at least one KPI measure that identifies a critical metric of an organization, and the at least one KPI measure specifying an aggregation on a column of a data object in the KPI alert template;

determining a set of one or more threshold parameters specifying one or more threshold conditions for the set of one or more query parameters; and defining an alert event to be transmitted to the user when a value associated with a query parameter exceeds a threshold condition specified by the set of one or more threshold parameters associated with the at least one query parameter;

upon the generation of the selected business event query template type, determine, from a set of input data source types, one or more compatible input data source types usable with the selected business event query template type based at least in part on actions associated with the selected business event query template type, the set of input data source types including a stream type data and a relation type data;

providing, via the first user interface, based at least in part on the received selection, the KPI alert template;

providing, via a second user interface, the set of one or more query parameters associated with the selected business event query template;

receiving, via the second user interface, a value associated with the at least one KPI measure from the set of one or more query parameters from the user;

receiving, via the second user interface, a user-selected input data source type of the one or more compatible input data source types;

providing, via a third interface, the set of one or more threshold parameters for the at least one KPI measure, the set of one or more threshold parameters specifying the one or more threshold conditions for the at least one KPI measure;

receiving, via the third user interface, one or more values associated with the set of one or more threshold parameters for the at least one KPI measure from the user;

generating a continuous query based at least in part on the set of one or more query parameters, the set of one or more threshold parameters, and the business event query template, the continuous query configured to provide the alert event when the value associated with the at least one KPI measure exceeds the threshold condition specified by the set of one or more threshold parameters associated with the at least one KPI measure;

receiving a request to save the generated continuous query;

generating an extensible markup language (XML) file configured to enable subsequent generation of the continuous query;

storing the extensible markup language file; and execute the continuous query on an input data source of the user-selected input data source type to retrieve the business event data associated with the user.

14. The computer-implemented method of claim 13, further comprising:

processing user data based at least in part on the generated continuous query; and providing the processed user data in a user interface configured for active display.

15. The computer-implemented method of claim 13, further comprising processing the user data based at least in part on the generated continuous query, wherein processing the user data includes at least receiving the user data from a stream or based at least in part on a relation.

16. The computer-implemented method of claim 13, further comprising dynamically loading a workflow at least in response to the received selection, and wherein generating the continuous query includes at least implementing the workflow based at least in part on the business event parameters.

17. The computer-implemented method of claim 13, further comprising providing a natural language statement for identifying functionality of the continuous query.

18. The system of claim 1, wherein the KPI alert template enables the user to generate a continuous query configured to provide the alert event when the value associated with the at least one KPI measure exceeds the threshold condition specified by the set of one or more threshold parameters associated with the at least one KPI measure.

19. The system of claim 1, wherein the KPI measure comprises at least one of a financial performance measure, a notification event, or a call processing time associated with an organization.

* * * * *

UNITED STATES PATENT AND TRADEMARK OFFICE
CERTIFICATE OF CORRECTION

PATENT NO. : 10,042,890 B2  
APPLICATION NO. : 13/827631  
DATED : August 7, 2018  
INVENTOR(S) : Hsiao et al.

Page 1 of 1

It is certified that error appears in the above-identified patent and that said Letters Patent is hereby corrected as shown below:

In the Specification

In Column 5, Line 36, delete "Serivce."" and insert -- Service." --, therefor.

In Column 5, Line 37, delete "Service e" and insert -- Service --, therefor.

Signed and Sealed this
Fourteenth Day of May, 2019

Andrei Iancu
*Director of the United States Patent and Trademark Office*